US012370795B2

(12) United States Patent
Aimono et al.

(10) Patent No.: US 12,370,795 B2
(45) Date of Patent: Jul. 29, 2025

(54) LIQUID EJECTING HEAD AND LIQUID EJECTING APPARATUS

(71) Applicant: SEIKO EPSON CORPORATION, Tokyo (JP)

(72) Inventors: Takanori Aimono, Matsumoto (JP); Yuma Fukuzawa, Matsumoto (JP); Shohei Mizuta, Matsumoto (JP); Shotaro Tamai, Matsumoto (JP); Shun Katsuie, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 161 days.

(21) Appl. No.: 18/163,034

(22) Filed: Feb. 1, 2023

(65) Prior Publication Data

US 2023/0249457 A1 Aug. 10, 2023

(30) Foreign Application Priority Data

Feb. 4, 2022 (JP) ................................ 2022-016087

(51) Int. Cl.
*B41J 2/14* (2006.01)

(52) U.S. Cl.
CPC ........ *B41J 2/14* (2013.01); *B41J 2002/14338* (2013.01)

(58) Field of Classification Search
CPC ................ B41J 2/14; B41J 2002/14338; B41J 2002/14419; B41J 2202/11; B41J 2202/12; B41J 2/14233; B41J 2/04581; B41J 2/14201
See application file for complete search history.

(56) References Cited

U.S. PATENT DOCUMENTS

2019/0283421 A1 9/2019 Miyazawa et al.

FOREIGN PATENT DOCUMENTS

JP 2019-155768 A 9/2019

*Primary Examiner* — Jannelle M Lebron
(74) *Attorney, Agent, or Firm* — WORKMAN NYDEGGER

(57) ABSTRACT

A liquid ejecting head includes: a nozzle; first to fourth pressure chambers; a communication flow path communicating between the nozzle and the first to fourth pressure chambers; first to fourth driving elements; a first common liquid chamber communicating with the first and the second pressure chambers; and a second common liquid chamber communicating with the third and the fourth pressure chambers. A first joining position from the first pressure chamber and the second pressure chamber to the nozzle is closer to end portions of the first pressure chamber and the second pressure chamber on a nozzle side than to the nozzle, and a second joining position from the third pressure chamber and the fourth pressure chamber to the nozzle is closer to end portions of the third pressure chamber and the fourth pressure chamber on the nozzle side than to the nozzle.

20 Claims, 18 Drawing Sheets

LIQUID EJECTING HEAD AND LIQUID EJECTING APPARATUS

The present application is based on, and claims priority from JP Application Serial Number 2022-016087, filed Feb. 4, 2022, the disclosure of which is hereby incorporated by reference herein in its entirety.

BACKGROUND

1. Technical Field

The present disclosure relates to a liquid ejecting head and a liquid ejecting apparatus.

2. Related Art

JP-A-2019-155768 discloses a liquid ejecting head in which four pressure chambers are provided on both sides of a nozzle, and flow paths from each of the four pressure chambers to the nozzle are joined near the nozzle.

However, in the above-described technology of the related art, the four flow paths from each of the four pressure chambers to the nozzles join in the vicinity of the nozzles, and thus there is a concern that the pressure waves directed from each of the pressure chambers to the nozzles will be excessively attenuated.

SUMMARY

According to an aspect of the present disclosure, there is provided a liquid ejecting head including: a nozzle for ejecting a liquid; first to fourth pressure chambers; a communication flow path coupled to the nozzle and communicating between the nozzle and the first to fourth pressure chambers; a first driving element that changes a pressure in the first pressure chamber; a second driving element that changes a pressure in the second pressure chamber; a third driving element that changes a pressure in the third pressure chamber; a fourth driving element that changes a pressure in the fourth pressure chamber; a first common liquid chamber that communicates with the first pressure chamber and the second pressure chamber; and a second common liquid chamber that communicates with the third pressure chamber and the fourth pressure chamber. In plan view, a first joining position where a first pressure wave transmitted from the first pressure chamber to the nozzle by the first driving element joins a second pressure wave transmitted from the second pressure chamber to the nozzle by the second driving element, is closer to a first end portion of the first pressure chamber on a nozzle side and a second end portion of the second pressure chamber on the nozzle side than to the nozzle. In plan view, a second joining position where a third pressure wave transmitted from the third pressure chamber to the nozzle by the third driving element joins a fourth pressure wave transmitted from the fourth pressure chamber to the nozzle by the fourth driving element, is closer to a third end portion of the third pressure chamber on the nozzle side and a fourth end portion of the fourth pressure chamber on the nozzle side than to the nozzle.

According to another aspect of the present disclosure, there is provided a liquid ejecting apparatus includes: the liquid ejecting head; and a liquid storage section for storing a liquid supplied to the liquid ejecting head.

DESCRIPTION OF EXEMPLARY EMBODIMENTS

A. First Embodiment

Figure 1:
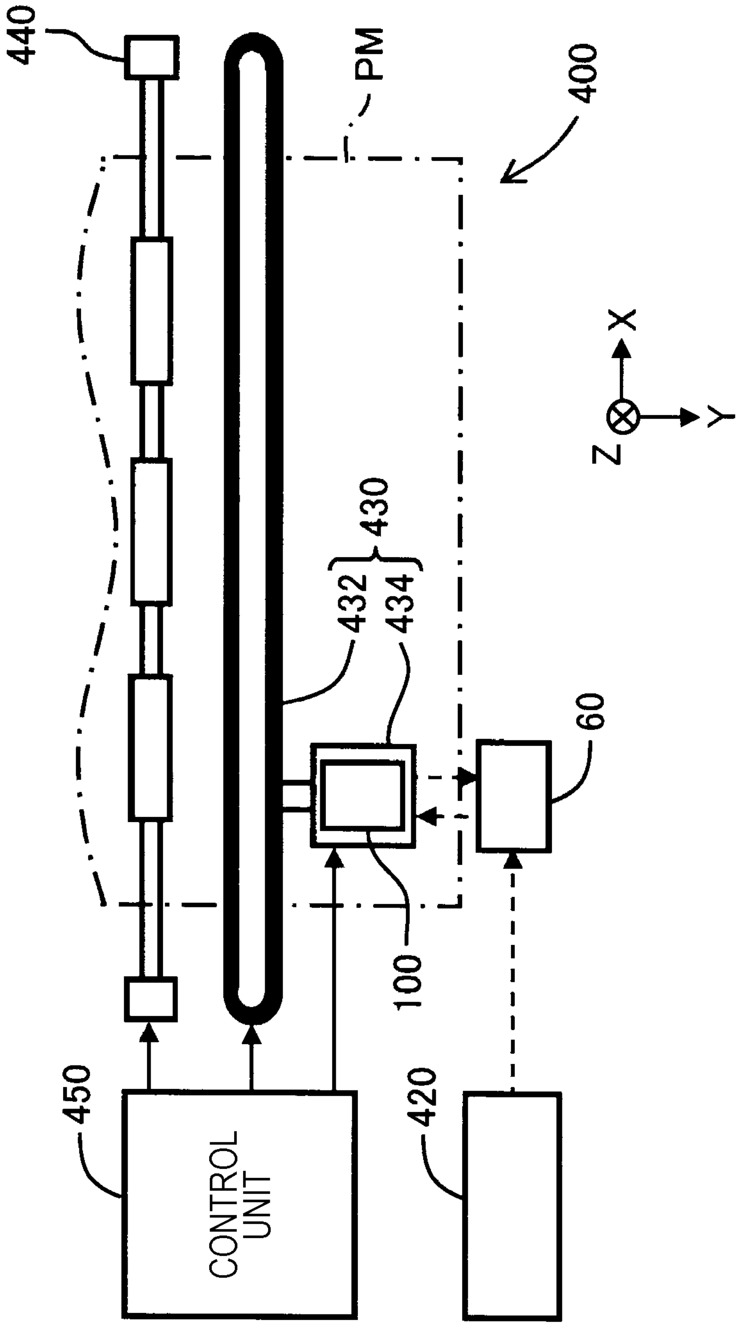
FIG. 1 is an explanatory view illustrating a configuration of a liquid ejecting apparatus according to an embodiment.

FIG. 1 is an explanatory view illustrating a configuration of a liquid ejecting apparatus 400 according to an embodiment. The liquid ejecting apparatus 400 is an ink jet type printing apparatus that ejects ink, which is an example of a liquid, onto a medium PM. The composition of the ink is not particularly limited. For example, the ink may be a water-based ink in which a coloring material such as a dye or pigment is dissolved in a water-based solvent, a solvent-based ink in which a coloring material is dissolved in an organic solvent, or an ultraviolet curable type ink. In addition, the liquid ejecting apparatus 400 may eject paint as a liquid instead of ink. A liquid storage section 420 for storing ink can be attached to the liquid ejecting apparatus 400. The liquid ejecting apparatus 400 executes printing by ejecting the ink in the liquid storage section 420 toward the medium PM. The liquid ejecting apparatus 400 includes a liquid ejecting head 100, a moving mechanism 430, a transport mechanism 440, a control unit 450, and a circulation mechanism 60.

The liquid ejecting head 100 includes a plurality of nozzles 200 and ejects liquid ink supplied from the liquid storage section 420 from the plurality of nozzles 200. Specific examples of the liquid storage section 420 include a container such as a cartridge that is attachable to and detachable from the liquid ejecting apparatus 400, a bag-shaped ink pack formed of a flexible film, and an ink tank that can be refilled with ink. Ink ejected from the nozzle 200 lands on the medium PM. The medium PM is typically a printing paper sheet. The medium PM is not limited to a printing paper sheet, and may be, for example, a printing target of any material such as a resin film or cloth.

The moving mechanism 430 includes a ring-shaped belt 432 and a carriage 434 fixed to the belt 432. The carriage 434 holds the liquid ejecting head 100. The moving mechanism 430 can reciprocate the liquid ejecting head 100 along the X direction by rotating the ring-shaped belt 432 in both directions.

The transport mechanism 440 transports the medium PM along the Y direction between movements of the liquid ejecting head 100 by the moving mechanism 430. The Y direction is a direction orthogonal to the X direction. In this embodiment, the X direction and the Y direction are horizontal directions. The Z direction is a direction intersecting the X direction and the Y direction. In this embodiment, the Z direction is vertically downward. The liquid ejecting head 100 ejects ink along the Z direction while being transported along the X direction. The Z direction is also referred to as "ejection direction Z". In the following description, the tip end side of the arrow indicating the X direction in the drawing is referred to as the +X side, and the base end side is referred to as the −X side. The tip end side of the arrow indicating the Y direction in the drawing is referred to as the +Y side, and the base end side is referred to as the −Y side. The tip end side of the arrow indicating the Z direction in the drawing is referred to as the +Z side, and the base end side is referred to as the −Z side.

The control unit 450 controls the operation of ejecting ink from the liquid ejecting head 100. The control unit 450 controls the transport mechanism 440, the moving mechanism 430, and the liquid ejecting head 100 to form an image on the medium PM.

Figure 2:
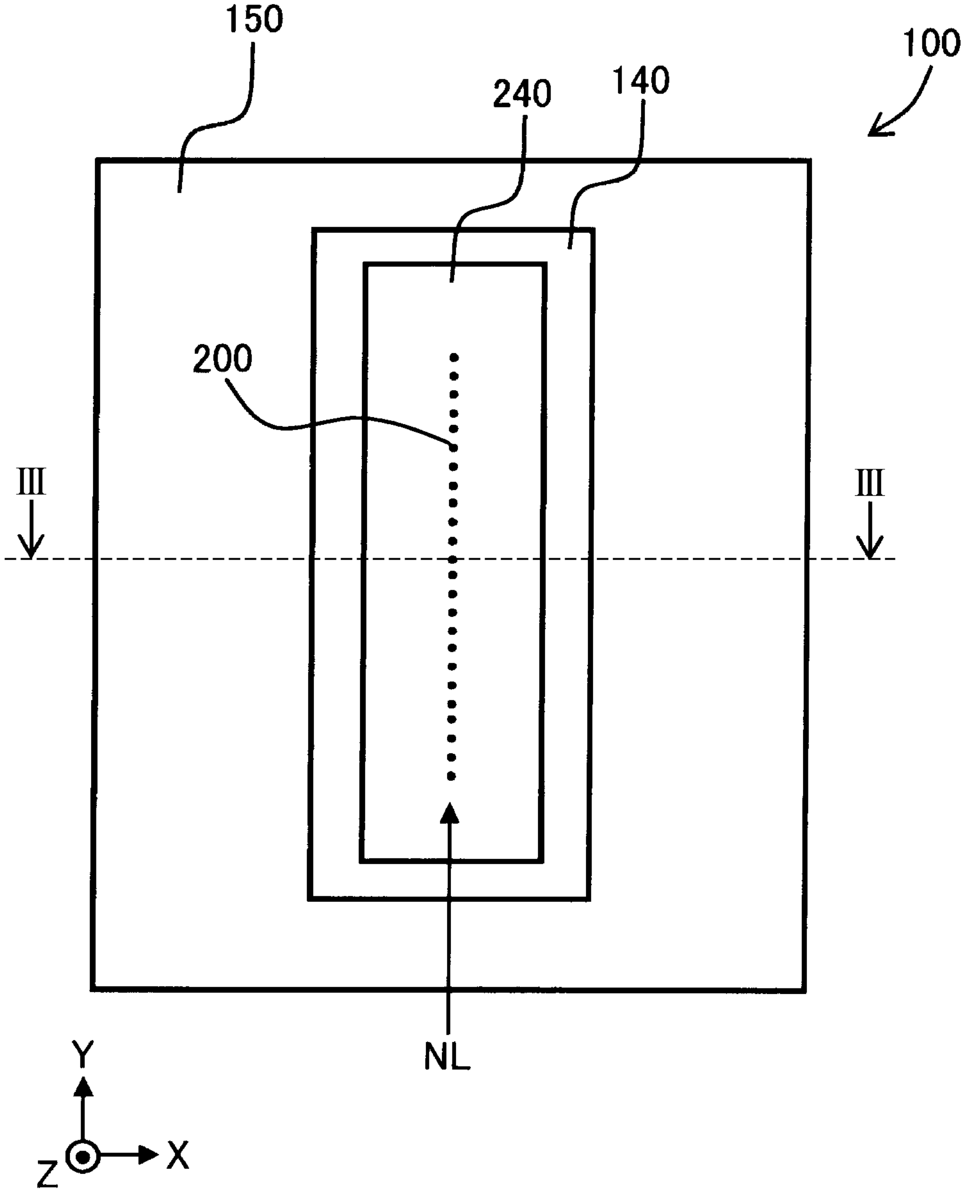
FIG. 2 is a bottom view of a liquid ejecting head.

FIG. 2 is a bottom view of the liquid ejecting head 100. The liquid ejecting head 100 includes the plurality of nozzles 200. The plurality of nozzles 200 are formed to penetrate a nozzle plate 240 disposed parallel to the XY plane. The plurality of nozzles 200 constitute a nozzle array NL by being linearly arranged along the Y direction. The nozzle plate 240 is manufactured, for example, by processing a silicon single crystal substrate using semiconductor processing technology. As the silicon single crystal substrate, for example, a (100) silicon single crystal substrate is preferably used. Note that the nozzle plate 240 may be made of a material such as stainless steel (SUS) or titanium.

Figure 3:
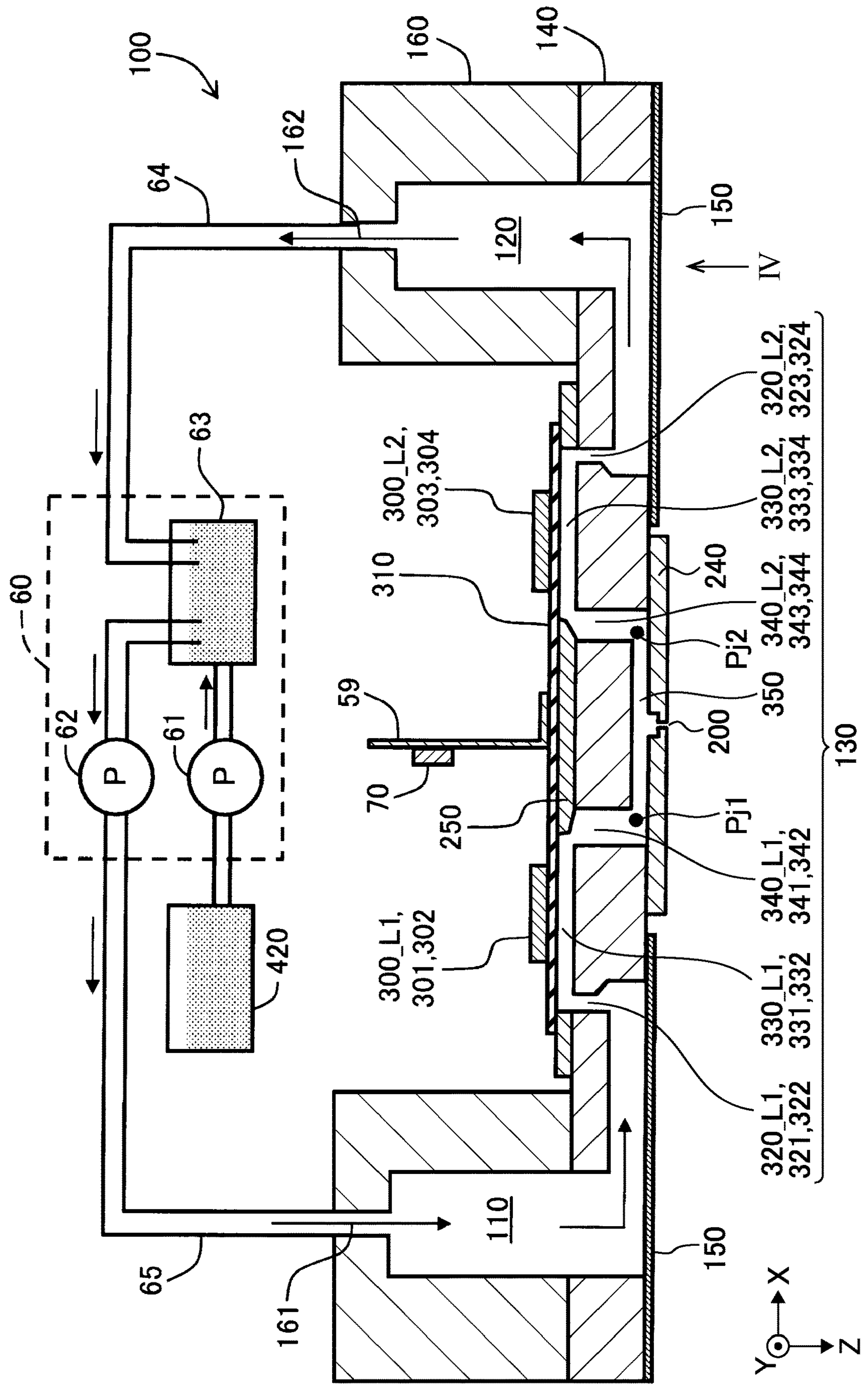
FIG. 3 is a cross-sectional view illustrating a cross section taken along the line III-III of FIG. 2.
Figure 4:
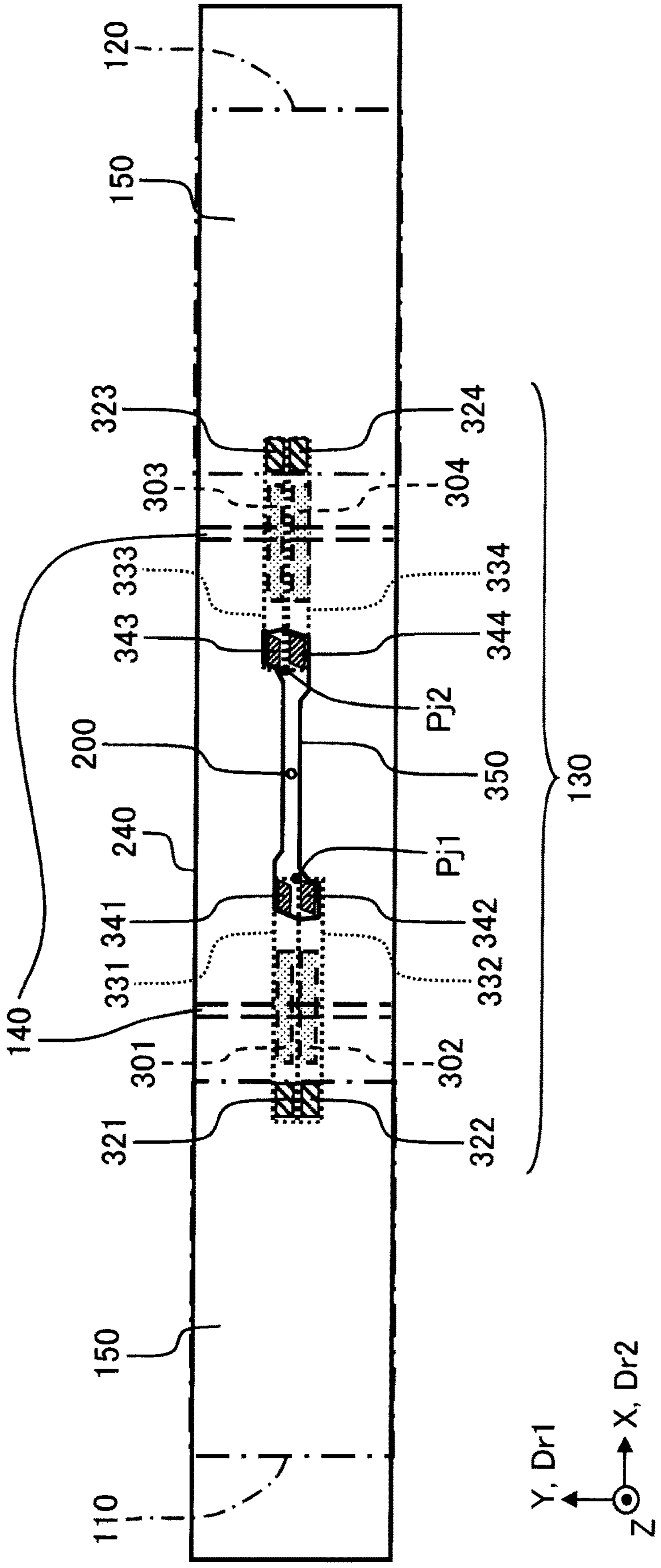
FIG. 4 is a view illustrating a part of a flow path for one nozzle viewed from the bottom of FIG. 3.
Figure 5:
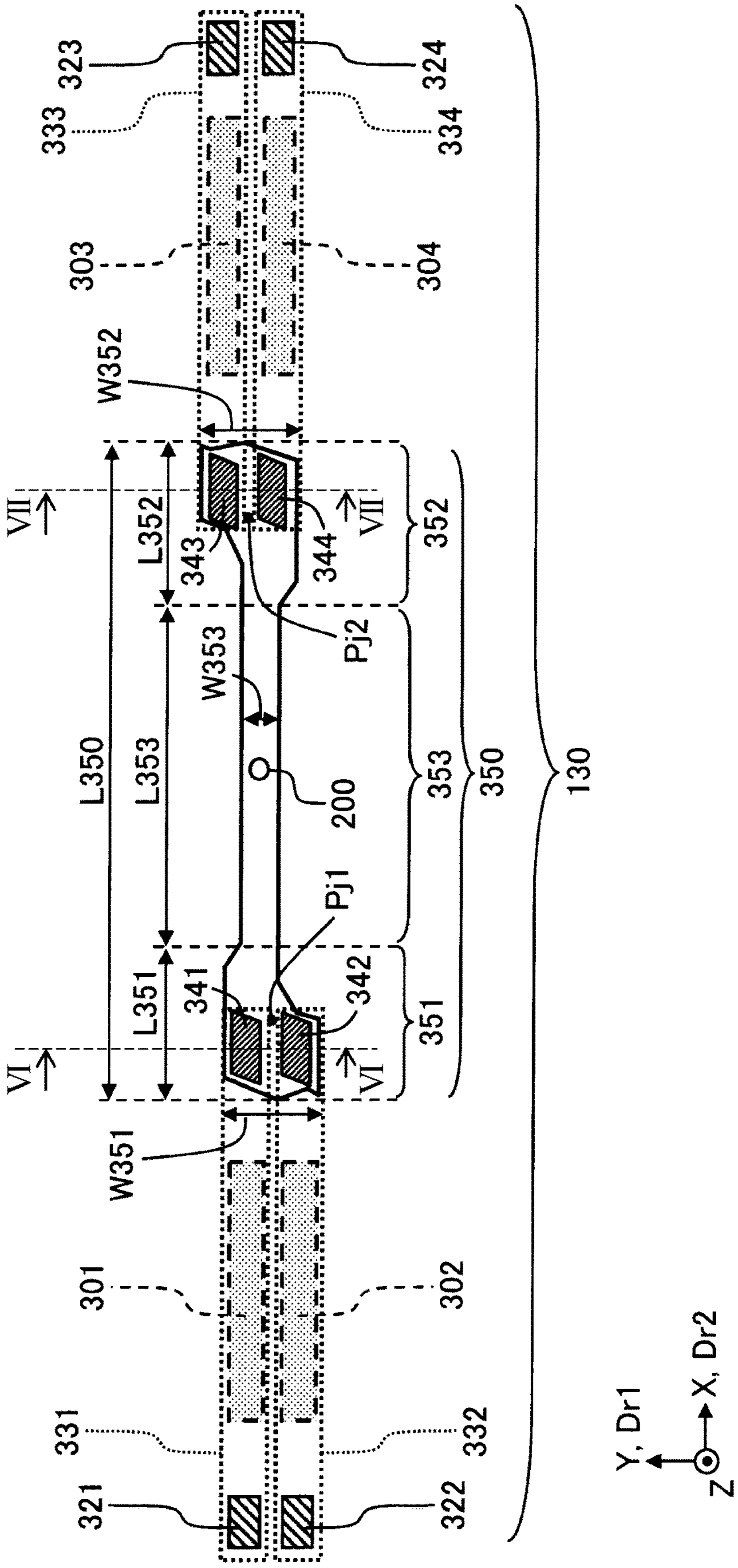
FIG. 5 is an enlarged view of the flow path of FIG. 4.
Figure 6:
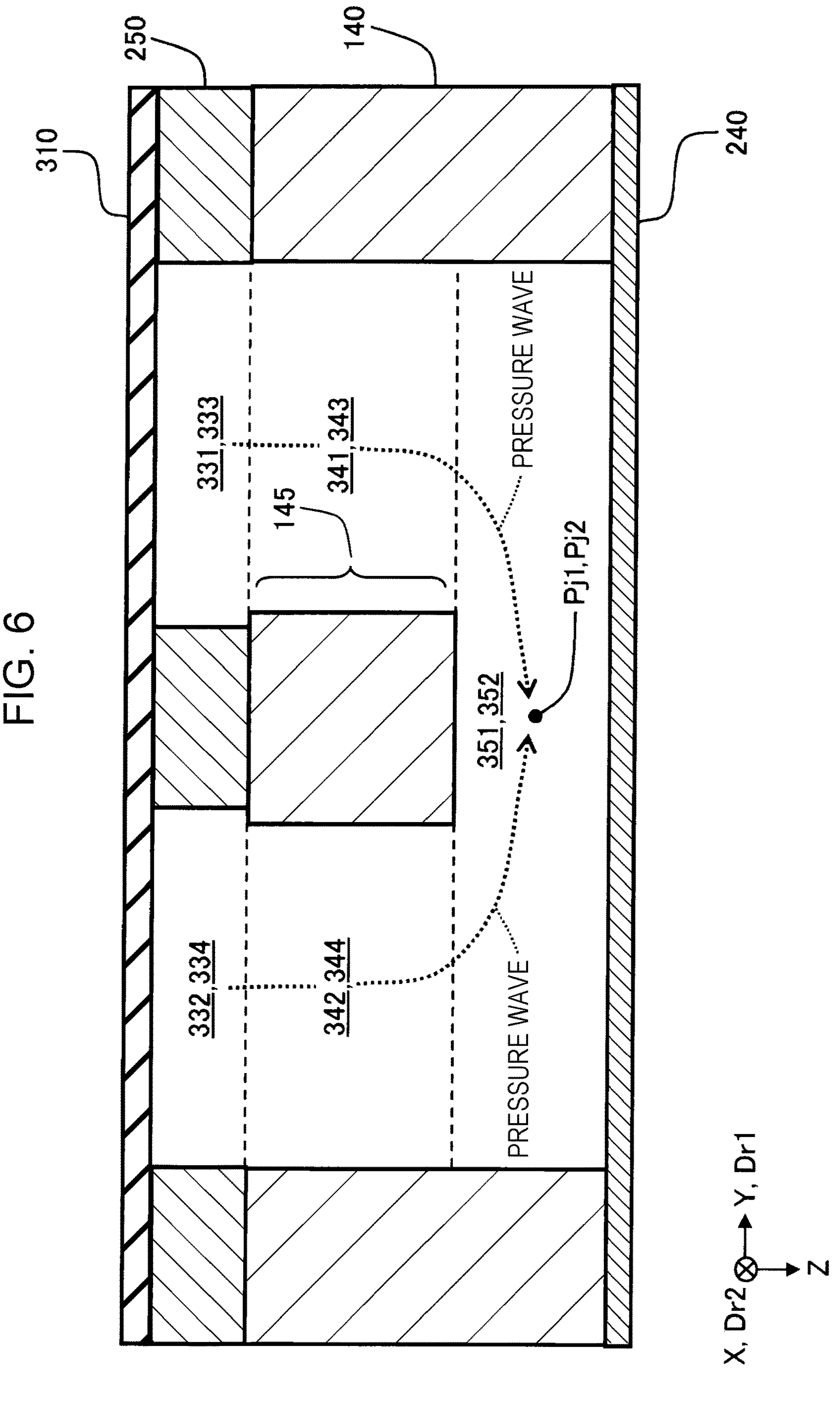
FIG. 6 is a cross-sectional view illustrating a cross section taken along the line VI-VI of FIG. 5.

FIG. 3 is a cross-sectional view taken along the line III-III of FIG. 2. FIG. 4 is a view illustrating a part of a flow path for one nozzle and common liquid chambers 110 and 120, viewed from the bottom of FIG. 3. FIG. 5 is an enlarged view of the flow path of FIG. 4. FIG. 6 is a cross-sectional view illustrating a cross section taken along the line VI-VI of FIG. 5. In addition, in FIGS. 4 and 5, for convenience of illustration, the communication flow path 350 is drawn with solid lines, the pressure chamber 330 is drawn with dotted lines, the driving element 300 is drawn with dashed lines, and the common liquid chambers 110 and 120 are drawn with dot dash lines. Further, in FIG. 6, after the reference numerals of each part in the cross section at the positions of the pressure chambers 331 and 332, the reference numerals of each part in the cross section taken along the line VII-VII of FIG. 5 at positions of other pressure chambers 333 and 334 are shown by commas.

As illustrated in FIG. 3, the liquid ejecting head 100 includes a first common liquid chamber 110 to which ink is supplied, a second common liquid chamber 120 to which ink is discharged, and a nozzle-specific flow path 130 that couples the first common liquid chamber 110 and the second common liquid chamber 120. The first common liquid chamber 110 and the second common liquid chamber 120 are provided commonly to the plurality of nozzles 200, and the nozzle-specific flow paths 130 are provided individually for the individual nozzles 200. Each of the common liquid chambers 110 and 120 extends in the Y direction, which is the direction along the nozzle array NL. That is, the longitudinal direction of the common liquid chambers 110 and 120 is parallel to the direction in which the plurality of nozzles 200 are arranged.

The liquid ejecting head 100 has a row L1 of the plurality of pressure chambers 330 communicating with the first common liquid chamber 110, and a row L2 of the plurality of pressure chambers 330 communicating with the second common liquid chamber 120. The row L1 is formed by arranging the plurality of pressure chambers 330 in the Y direction, and the row L2 is formed by arranging the plurality of pressure chambers 330 in the Y direction. The row L1 is arranged on the −X side with respect to the nozzle array NL, and the row L2 is arranged on the +X side with respect to the nozzle array NL. Hereinafter, the plurality of pressure chambers 330 forming the row L1 will be referred to as pressure chambers 330 L1, and the plurality of pressure chambers 330 forming the row L2 will be referred to as pressure chambers 330 L2. Regarding the driving elements 300, the coupling flow paths 320, and the communication holes 340, which will be described later in detail, the driving element 300 corresponding to the row L1 is referred to as a driving element 300 L1, the driving element 300 corresponding to the row L2 is referred to as a driving element 300 L2, a coupling flow path 320 corresponding to the row L1 is referred to as a coupling flow path 320 L1, a coupling flow path 320 corresponding to the row L2 is referred to as a coupling flow path 320 L2, a communication hole 340 corresponding to the row L1 is referred to as a communication hole 340 L1, and a communication hole 340 corresponding to the row L2 is referred to as a communication hole 340 L2.

The nozzle-specific flow paths 130 corresponding to one nozzle 200 in this embodiment include two pressure chambers 330 L1 in the row L1, two pressure chambers 330 L2 in the row L2, two coupling flow paths 320 L1 corresponding to each of the two pressure chambers 330 L1, two coupling flow paths 320 L2 corresponding to each of the two pressure chambers 330 L2, two communication holes 340 L1 corresponding to each of the two pressure chambers 330 L1, two communication holes 340 L2 corresponding to each of the two pressure chambers 330 L2, and the communication flow path 350. Here, the two pressure chambers 330 L1 in the row L1 are referred to as pressure chambers 331 and 332, the two pressure chambers 330 L2 in the row L2 are referred to as pressure chambers 333 and 334, these two coupling flow paths 320 L1 are referred to as coupling flow paths 321 and 322, these two coupling flow paths 320 L2 are referred to as coupling flow paths 323 and 324, these two communication holes 340 L1 are referred to as communication holes 341 and 342, and these two communication holes 340 L2 are referred to as communication holes 343 and 344. In addition, the four driving elements 300 corresponding to each of the pressure chambers 331 to 334 are referred to as driving elements 301 to 304.

Each of the common liquid chambers 110 and 120 can be considered to extend in the Y direction or in the direction in which the adjacent pressure chambers 331 and 332 are arranged, that is, the direction in which the row L1 of the pressure chambers 330 extends in the extending direction. In this embodiment, the direction in which the adjacent pressure chambers 331 and 332 are arranged is an example of the "first direction". In addition, the plurality of nozzle-specific flow paths 130 are arranged in the Y direction along the nozzle array NL.

The lower portions of the common liquid chambers 110 and 120 and the plurality of nozzle-specific flow paths 130 are mainly formed by a communication plate 140. The communication plate 140 may be configured by laminating a plurality of plate-shaped members. A housing section 160 and a pressure chamber substrate 250 are installed on the upper surface of the communication plate 140, that is, the surface of the communication plate 140 facing the −Z side. The pressure chamber substrate 250 is positioned inside the housing section 160 in plan view in the Z direction. A vibrating plate 310 is positioned on the upper surface of the pressure chamber substrate 250, that is, the surface of the pressure chamber substrate 250 facing the −Z side. The plurality of pressure chambers 330 are provided in the pressure chamber substrate 250. Each pressure chamber 330 is a space defined by the communication plate 140, the vibrating plate 310, and the pressure chamber substrate 250. The pressure chamber substrate 250 is manufactured, for example, by processing a silicon single crystal substrate using semiconductor processing technology. As the silicon single crystal substrate, for example, a (110) silicon single crystal substrate is preferably used.

The vibrating plate 310 is a plate-shaped member that can elastically vibrate. The vibrating plate 310 is, for example, a laminated body including a first layer made of silicon oxide ($SiO_2$) and a second layer made of zirconium oxide ($ZrO_2$). Further, another layer such as a metal oxide may be interposed between the first layer and the second layer. Further, a part or all of the vibrating plate 310 may be integrally made of the same material as the pressure chamber substrate 250. For example, the vibrating plate 310 and the pressure chamber substrate 250 can be integrally formed by selectively removing a part of the thickness direction of the region corresponding to the pressure chamber 330 in a plate-shaped member having a predetermined thickness by etching or the like. Further, the vibrating plate 310 may be composed of a layer of a single material.

A nozzle plate 240 is installed on the lower surface of the communication plate 140, that is, the surface facing the +Z side of the communication plate 140, and the lower end portions of the first common liquid chamber 110 and the second common liquid chamber 120, that is, the end portions on the +Z side of the first common liquid chamber 110 and the second common liquid chamber 120 are sealed with a flexible sealing film 150 made of a resin film, a thin metal film, or the like.

A wiring substrate 59 is bonded to the surface of the vibrating plate 310 facing the −Z side. The wiring substrate 59 is a mounting component formed with a plurality of wirings for electrically coupling the control unit 450 and the liquid ejecting head 100. The wiring substrate 59 is, for example, a flexible wiring substrate such as a flexible printed circuit (FPC) or a flexible flat cable (FFC). A drive circuit 70 for driving the driving element 300 is mounted on the wiring substrate 59. The drive circuit 70 supplies a driving signal to each driving element 300.

A plurality of driving elements 300 are provided corresponding to each of the pressure chambers 330 on the upper surface of the vibrating plate 310, that is, the surface of the vibrating plate 310 facing the −Z side. These driving elements 300 are composed of piezoelectric elements, for example. The piezoelectric element is composed of, for example, a piezoelectric layer and two electrodes provided to sandwich the piezoelectric layer. For example, when the driving elements 301 to 304, which are piezoelectric elements, vibrate, the vibrations are transmitted to the pressure chambers 331 to 334, respectively, and pressure waves are generated in the pressure chambers 331 to 334, respectively. Ink is ejected from nozzles 200 by the pressure generated by the driving elements 301 to 304. When ink is ejected from the nozzle 200, it is preferable that the four driving elements 301 to 304 corresponding to the nozzle 200 be driven simultaneously in the same phase. As the driving element, a heating element that heats the ink in the pressure chamber 330 may be used instead of the piezoelectric element.

The circulation mechanism 60 is coupled to the common liquid chambers 110 and 120. The circulation mechanism 60 supplies ink to the first common liquid chamber 110 and collects ink discharged from the second common liquid chamber 120 for resupply to the first common liquid chamber 110. The circulation mechanism 60 includes a first supply pump 61, a second supply pump 62, a storage container 63, a collection flow path 64, and a supply flow path 65.

The first supply pump 61 is a pump that supplies the ink stored in the liquid storage section 420 to the storage container 63. The storage container 63 is a sub tank that temporarily stores the ink supplied from the liquid storage section 420. The collection flow path 64 is interposed between the second common liquid chamber 120 and the storage container 63 and is a flow path for collecting the ink from the second common liquid chamber 120 to the storage container 63. The ink stored in the liquid storage section 420 is supplied from the first supply pump 61 to the storage container 63. Further, the ink, which is supplied from the first common liquid chamber 110 to each nozzle-specific flow path 130, but is discharged from each nozzle-specific flow path 130 to the second common liquid chamber 120 without being ejected from the nozzle 200, is supplied to the storage container 63 through the collection flow path 64. The second supply pump 62 is a pump that sends the ink stored in the storage container 63. The supply flow path 65 is interposed between the first common liquid chamber 110 and the storage container 63 and is a flow path for supplying the ink in the storage container 63 to the first common liquid chamber 110.

An opening portion 161 at the upper end of the first common liquid chamber 110, that is, the end portion on the −Z side of the first common liquid chamber 110 is coupled to the supply flow path 65 outside the liquid ejecting head 100. In other words, the opening portion 161 of this embodiment functions as an inlet for introducing the liquid from the circulation mechanism 60. An opening portion 162 at the upper end of the second common liquid chamber 120, that is, the end portion on the −Z side of the second common liquid chamber 120 is coupled to the collection flow path 64 of the circulation mechanism 60 outside the liquid ejecting head 100. In other words, the opening portion 162 of this embodiment functions as an outlet for discharging the liquid to the circulation mechanism 60.

The nozzle-specific flow path 130 has the following flow paths and spaces. In the following description, the term "coupling" is used in the sense of direct coupling. In addition, the term "communication" is used in a broad sense including not only direct coupling but also indirect coupling.

Coupling Flow Paths 321 to 324

The first coupling flow path 321 couples the first common liquid chamber 110 and the first pressure chamber 331.

The second coupling flow path 322 couples the first common liquid chamber 110 and the second pressure chamber 332.

The third coupling flow path 323 couples the second common liquid chamber 120 and the third pressure chamber 333.

The fourth coupling flow path 324 couples the second common liquid chamber 120 and the fourth pressure chamber 334.

All of the coupling flow paths 321 to 324 are flow paths extending in the Z direction and penetrate the communication plate 140. In FIGS. 4 and 5, the coupling flow paths 321 to 324 are hatched for convenience of illustration. A part where the coupling flow path 320 and the pressure chamber 330 intersect can be regarded as a part of the pressure chamber 330.

Pressure Chambers 331 to 334

The first pressure chamber 331 to the fourth pressure chambers 334 are spaces that receive pressure changes by the first driving element 301 to the fourth driving elements 304, respectively. The first pressure chamber 331 and the second pressure chamber 332 are arranged side by side in a first direction Dr1, and the third pressure chamber 333 and the fourth pressure chamber 334 are also arranged side by side in the first direction Dr1. In this embodiment, the first direction Dr1 is parallel to the Y direction. The first pressure chamber 331 and the second pressure chamber 332, and the third pressure chamber 333 and the fourth pressure chamber 334 are arranged to be shifted in a second direction Dr2 orthogonal to the first direction Dr1. In this embodiment, the second direction Dr2 is parallel to the X direction. The pressure waves generated in the first pressure chamber 331 to the fourth pressure chamber 334 reach the nozzle 200 and eject ink from the nozzle 200. The pressure chambers 331 to 334 preferably have the same shape. Although the plurality of pressure chambers 331 to 334 are arranged in a zigzag pattern in this embodiment, they may not be arranged in a zigzag pattern. Each pressure chamber 330 extends in the second direction Dr2.

Communication Holes 341 to 344

The first communication hole 341 to the fourth communication hole 344 are flow paths respectively extending in the Z direction and coupling the communication flow path 350 and each of the first pressure chamber 331 to the fourth pressure chamber 334. That is, each of the pressure chambers 330 has one end coupled to the coupling flow path 320 and the other end coupled to the communication hole 340. The first communication hole 341 to the fourth communication hole 344 are examples of the "first flow path" to the "fourth flow path", respectively. In addition, in FIGS. 4 and 5, the communication holes 341 to 344 are hatched for convenience of illustration. The first communication hole 341 and the second communication hole 342 are arranged side by side in the first direction Dr1, and the third communication hole 343 and the fourth communication hole 344 are also arranged side by side in the first direction Dr1. In FIG. 6, the first communication hole 341 and the second communication hole 342 are partitioned by a communication hole partition wall 145. The communication holes 341 to 344 are flow paths extending in the same direction as the coupling flow paths 321 to 324 and penetrate the communication plate 140. The communication holes 341 to 344 preferably have the same shape. A part where the communication hole 340 and the pressure chamber 330 intersect can be regarded as a part of the pressure chamber 330.

Communication Flow Path 350

As illustrated in FIG. 3, the communication flow path 350 is a flow path that is coupled to the nozzle 200 and communicates between the nozzle 200 and the first pressure chamber 331 to the fourth pressure chamber 334. In addition, the communication flow path 350 is a flow path extending along the nozzle surface of the nozzle plate 240 on which the plurality of nozzles 200 are formed, and the nozzles 200 are provided in the middle of the communication flow path 350. Specifically, the communication flow path 350 extends along the X direction and is defined by the communication plate 140 and the surface of the nozzle plate 240 facing the −Z side. As illustrated in FIG. 5, the communication flow path 350 includes a first part 351, a second part 352, and a third part 353. The first part 351 of the communication flow path 350 is disposed at one end of the communication flow path 350 and coupled to the first communication hole 341 and the second communication hole 342. The second part 352 of the communication flow path 350 is disposed at the other end of the communication flow path 350 and coupled to the third communication hole 343 and the fourth communication hole 344. The third part 353 of the communication flow path 350 is coupled between the first part 351 and the second part 352. Note that the third part 353 is a part narrower than the width of the first part 351 or the second part 352 in the first direction Dr1. Further, in this embodiment, a width W353 of the third part 353 in the first direction Dr1 is constant. In addition, a part where the first to fourth communication holes 341 to 344 and the communication flow path 350 intersect can be regarded as a part of the communication flow path 350.

The pressure waves generated in the first pressure chamber 331 and the second pressure chamber 332 are joined at the lower end portions of the first communication hole 341 and the second communication hole 342, that is, a first joining position Pj1 near the end portions on the +Z side of the first communication hole 341 and the second communication hole 342. The pressure waves generated in the third pressure chamber 333 and the fourth pressure chamber 334 are joined at the lower end portions of the third communication hole 343 and the fourth communication hole 344, that is, a second joining position Pj2 near the end portions on the +Z side of the third communication hole 343 and the fourth communication hole 344. These pressure waves act as a driving force for ejecting ink from the nozzles 200.

As the ink, for example, a liquid having pseudoplasticity can be used. More specifically, it is preferable that the ink have a viscosity of 0.01 Pa·s or more and 0.2 Pa·s or less at a shear rate of 1000 $s^{-1}$ at 25° C., and a viscosity of 0.5 Pa·s or more and 50 Pa·s or less at a shear rate of 0.01 $s^{-1}$. In this embodiment, the four pressure chambers 331 to 334 are used to reduce the cross-sectional area of each flow path, increase the flow velocity, and reduce the viscosity of the ink, thereby making it possible to use liquid ink having pseudoplasticity. However, from the pressure chambers 331 to 334 to the nozzle 200, it is desirable to efficiently use the energy of the driving elements 301 to 304, and thus it is not preferable to excessively increase the flow path resistance. Therefore, in this embodiment, as illustrated in FIG. 5, the individual flow paths from the adjacent pressure chambers 330 to the nozzle 200 are joined earlier at the joining positions Pj1 and Pj2 closer to the pressure chamber than to the nozzle 200. Accordingly, the flow path resistance is prevented from becoming excessively large.

In this embodiment, four pressure chambers 331 to 334 are provided for one nozzle 200, but five or more pressure chambers may be provided. In either case, driving elements are provided to correspond to individual pressure chambers.

The nozzle-specific flow path 130 of this embodiment can be considered to include four individual flow paths corresponding to the four driving elements 301 to 304. An "individual flow path" is a flow path including at least the pressure chamber 330, and one individual flow path corresponds to one driving element 300. In this embodiment, the first individual flow path can be considered to include the first coupling flow path 321, the first pressure chamber 331, and the first communication hole 341. The second to fourth individual flow paths can also be grasped in the same manner.

The liquid ejecting head 100 of the first embodiment has the following features related to attenuation of pressure waves.

Feature F1

As illustrated in FIG. 5, the first joining position Pj1 is closer to the end portion of the pressure chambers 331 and 332 on the nozzle 200 side than to the nozzle 200 in plan view in the Z direction. That is, the distance from the first joining position Pj1 to each end portion of the pressure chambers 331 and 332 on the nozzle 200 side is shorter than the distance from the first joining position Pj1 to the nozzle 200. Here, the "first end portion of the pressure chamber 331 on the nozzle 200 side" means the end portion opposite to the first common liquid chamber 110, that is, the end portion on the +X side, of both end portions of the pressure chamber 331 in the X direction. The "second end portion of the pressure chamber 332 on the nozzle 200 side" means the end portion opposite to the first common liquid chamber 110, that is, the end portion on the +X side, of both end portions of the pressure chamber 332 in the X direction. Similarly, the second joining position Pj2 is closer to the end portions of the pressure chambers 333 and 334 than to the nozzle 200 in plan view in the Z direction. The "third end portion of the pressure chamber 333 on the nozzle 200 side" means the end portion opposite to the second common liquid chamber 120, that is, the end portion on the −X side, of both end portions of the pressure chamber 333 in the X direction. The "fourth end portion of the pressure chamber 334 on the nozzle 200 side" means the end portion opposite to the second common liquid chamber 120, that is, the end portion on the −X side, of both end portions of the pressure chamber 334 in the X direction.

According to this feature F1, the pressure wave from the first pressure chamber 331 and the pressure wave from the second pressure chamber 332 are combined not in the vicinity of the nozzle 200 but in the vicinity of the pressure chambers 331 and 332. Therefore, compared to the example of the related art in which the pressure wave from the first pressure chamber 331 and the pressure wave from the second pressure chamber 332 are combined in the vicinity of the nozzle 200, excessive attenuation of pressure waves directed from the individual pressure chambers 330 to the nozzles 200 can be prevented. The same applies to the third pressure chamber 333 and the fourth pressure chamber 334 as well.

Moreover, according to the feature F1, compared to the example of the related art, the ratio of the part common to the pressure chambers 331 and 332 in the flow path from each end portion of the pressure chambers 331 and 332 to the nozzle 200 can be increased. Therefore, compared to the example of the related art, the flow path resistance from the pressure chambers 331 and 332 to the nozzle 200 can be reduced. The same applies to the third pressure chamber 333 and the fourth pressure chamber 334 as well. As a result, the pressure loss can be reduced and ejection efficiency can be improved. In particular, when using high-viscosity ink such as pseudoplastic ink, the effect of improving ejection efficiency is remarkable. On the other hand, as in the example of the related art, in the configuration in which the pressure waves join in the vicinity of the nozzle 200, the pressure waves are greatly attenuated and the ejection efficiency is lowered. In addition, there is a concern that it will be difficult to refill the nozzles 200 with ink, or that air bubbles will be caught in the nozzles.

In addition, the first joining position Pj1 can also be considered as the joining position of the flow path from the first pressure chamber 331 to the nozzle 200 and the flow path from the second pressure chamber 332 to the nozzle 200. Similarly, the second joining position Pj2 can also be considered as the joining position of the flow path from the third pressure chamber 333 to the nozzle 200 and the flow path from the fourth pressure chamber 334 to the nozzle 200. As described above, in practice, the liquid is supplied from the outside to the first common liquid chamber 110, and guided from the first common liquid chamber 110 to the first pressure chamber 331 and the second pressure chamber 332. After this, a part of the liquid is ejected from the nozzle 200 in the communication flow path 350, guided to the second common liquid chamber 120 via the third pressure chamber 333 and the fourth pressure chamber 334, and discharged from the second common liquid chamber 120 to the outside. Therefore, both the "flow path from the third pressure chamber 333 to the nozzle 200" and the "flow path from the fourth pressure chamber 334 to the nozzle 200" are assumed to flow in the opposite orientation to the actual liquid flow. However, it can be understood that these flow paths can be assumed regardless of the orientation of the liquid.

Feature F2

As illustrated in FIG. 5, in plan view in the Z direction, the first joining position Pj1 is between the first pressure chamber 331 and the second pressure chamber 332, and the second joining position Pj2 is between the third pressure chamber 333 and the fourth pressure chamber 334.

Feature F3

As illustrated in FIG. 5, the communication flow path 350 has the first joining position Pj1 at one end portion and the second joining position Pj2 at the other end portion. According to this feature F3, the pressure waves from the pressure chambers 331 and 332 join near their sources, the pressure waves from the pressure chambers 333 and 334 join near their sources, and thus attenuation of pressure waves can be suppressed more efficiently.

Feature F4

As illustrated in FIGS. 5 and 6, the first joining position Pj1 is positioned at the first part 351 of the communication flow path 350, and the second joining position Pj2 is positioned at the second part 352 of the communication flow path 350. According to this feature F4, as illustrated in FIG. 6, the communication hole partition walls 145 exist between the communication holes 341 and 342 adjacent to each other and between the communication holes 343 and 344, respectively, and thus crosstalk between the pressure chambers 331 and 332 and crosstalk between the pressure chambers 333 and 334 can be reduced.

Feature F5

As illustrated in FIG. 5, a dimension L353 of the third part 353 of the communication flow path 350 measured in the second direction Dr2 is longer than a dimension L351 of the first part 351. In addition, a dimension L353 of the third part 353 is longer than a dimension L352 of the second part 352.

Feature F6

As illustrated in FIG. 5, the third part 353 of the communication flow path 350 is coupled to the nozzle 200. According to this feature F6, the pressure waves from the pressure chambers 331 to 334 join near their sources, and thus attenuation of pressure waves can be suppressed more efficiently.

Feature F7

As illustrated in FIG. 5, a width W353 of the third part 353 of the communication flow path 350 measured in the first direction Dr1 is smaller than a width W351 of the first part 351. In addition, the width W353 of the third part 353 is smaller than the width W352 of the second part 352. According to this feature F7, when using a liquid having pseudoplasticity, the width W353 of the third part 353 is reduced, and accordingly, it is possible to increase the flow velocity in the vicinity of the nozzle 200 and reduce the viscosity of the ink in the vicinity of the nozzle 200.

Feature F8

As illustrated in FIG. 3, each of the first communication hole 341 to the fourth communication hole 344 extends in a direction intersecting the extending direction of the communication flow path 350. That is, the longitudinal direction of each of the first communication hole 341 to the fourth communication hole 344 is the direction intersecting the longitudinal direction of the communication flow path 350. In this embodiment, the X direction is an example of the "extending direction of the communication flow path 350", and the Z direction is an example of the "direction intersecting the extending direction of the communication flow path 350".

It is also possible to consider that the first communication hole 341 to the fourth communication hole 344 extend in a direction intersecting the direction in which the pressure chambers 330 adjacent to each other are arranged. In addition, as can be seen from FIG. 3, it is also possible to consider that the first communication hole 341 to the fourth communication hole 344 extend in the direction perpendicular to the front surface of the nozzle plate 240. Furthermore, it is also possible to consider that the first communication hole 341 to the fourth communication hole 344 extends in the ejection direction Z.

Feature F9

As illustrated in FIG. 3, each of the communication holes 341 to 344 is closer to the nozzle 200 than is the coupling flow paths 321 to 324 in plan view in the Z direction. In other words, each distance from each of the communication holes 341 to 344 to the coupling flow paths 321 to 324 is shorter than each distance from each of the communication holes 341 to 344 to the nozzle 200. According to this feature F9, the communication flow path 350 can be shortened, and the flow path resistance can be reduced.

As described above, according to the first embodiment, the liquid ejecting head 100 has at least some of the features F1 to F9 described above, and thus the pressure waves can be combined on the pressure chambers 331 to 334 side instead of on the nozzle 200 side, and excessive attenuation of pressure waves directed from the individual pressure chambers 330 to the nozzles 200 can be prevented. Note that some of the features described above can be omitted.

B. Other Embodiments

Figure 7:
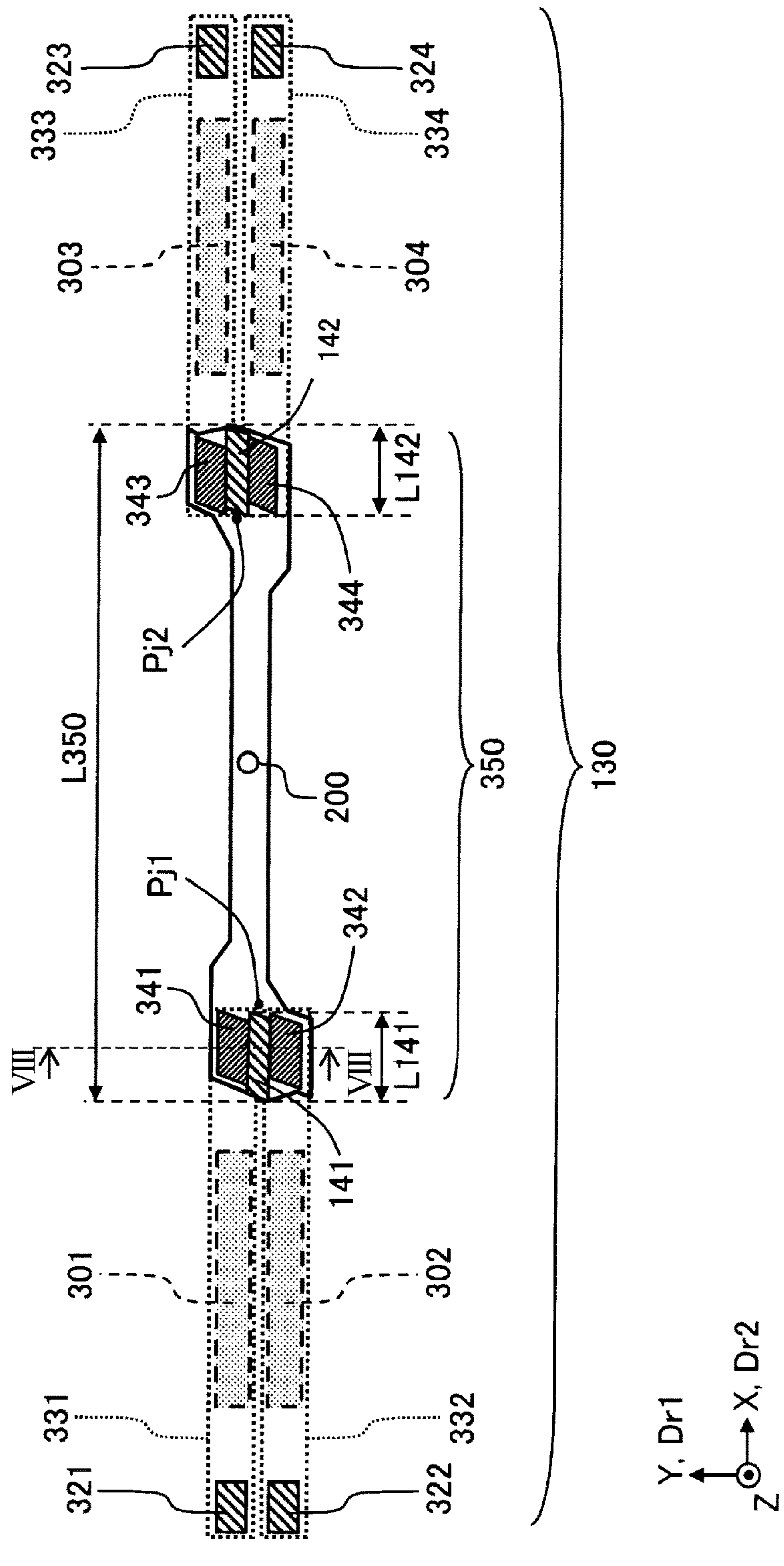
FIG. 7 is an enlarged view of a flow path of a second embodiment.
Figure 8:
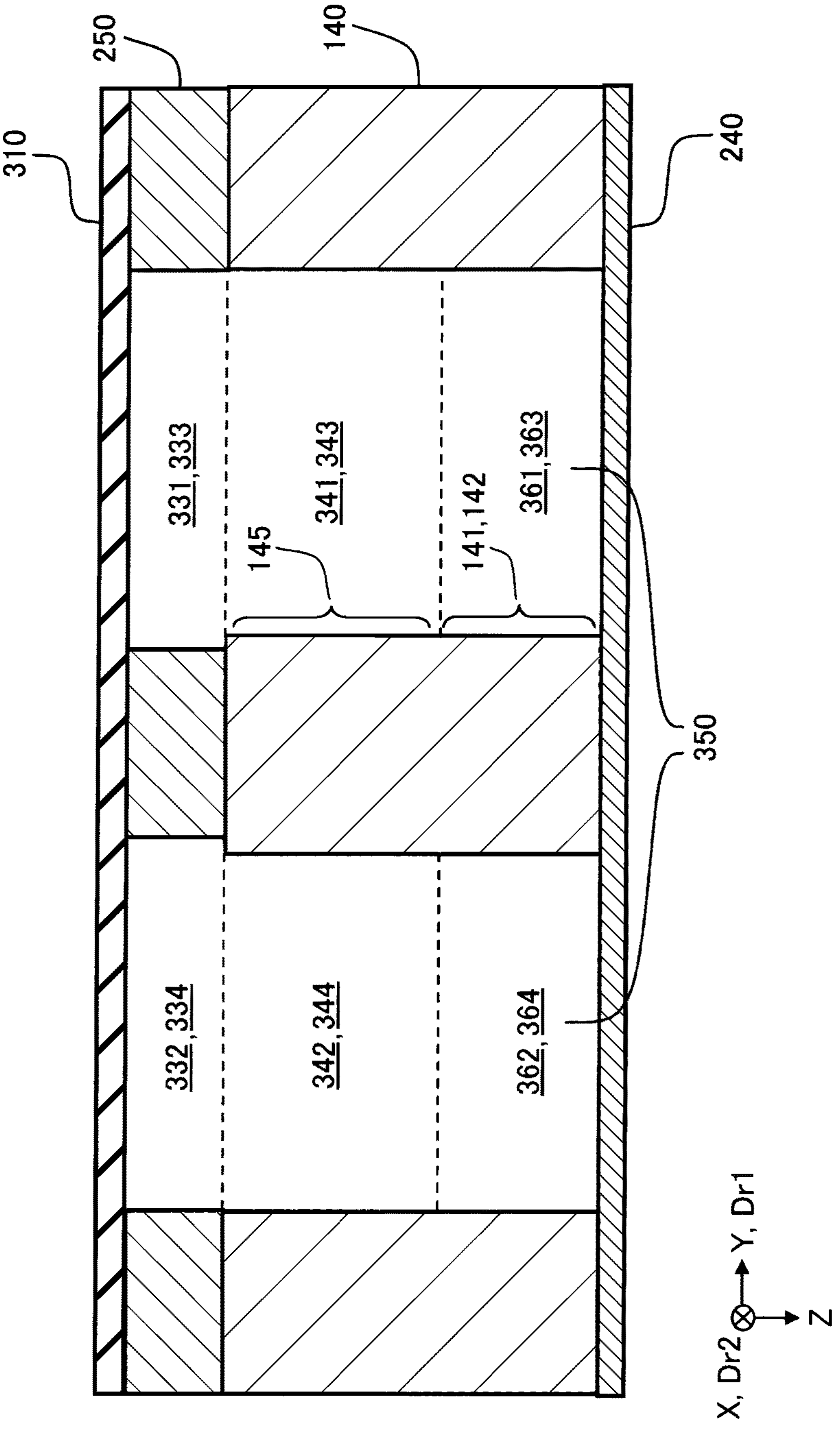
FIG. 8 is a cross-sectional view illustrating a cross section taken along the line VIII-VIII of FIG. 7.

FIG. 7 is an enlarged view of the nozzle-specific flow path 130 of the second embodiment, and FIG. 8 is a view corresponding to FIG. 6 of the first embodiment, and is a cross-sectional view illustrating a cross section taken along the line VIII-VIII of FIG. 7. The second embodiment is different from the first embodiment in that the coupling sections 361 and 362 are provided at one end portion of the communication flow path 350, a first partition wall portion 141 is provided between the first coupling section 361 and the second coupling section 362, coupling sections 363 and 364 are provided at the other end portion of the communication flow path 350, and a second partition wall portion 142 is provided between the third coupling section 363 and the fourth coupling section 364, and other points are substantially the same as those of the first embodiment.

As illustrated in FIG. 8, the first partition wall portion 141 is bonded to the surface on the −Z side of the nozzle plate 240 to partition the communication flow path 350 into the first coupling section 361 individually coupled to the first communication hole 341 and the second coupling section 362 individually coupled to the second communication hole 342. These coupling sections 361 and 362 are provided at one end portion of the communication flow path 350 on the −X side. Similarly, the second partition wall portion 142 is bonded to the surface on the −Z side of the nozzle plate 240 to partition the communication flow path 350 into the third coupling section 363 individually coupled to the third communication hole 343 and the fourth coupling section 364 individually coupled to the fourth communication hole 344. These coupling sections 363 and 364 are provided at the other end portion of the communication flow path 350 on the +X side.

Even in the second embodiment, four individual flow paths corresponding to the individual pressure chambers 331 to 334 can be considered. For example, the first individual flow path can be considered to include the first coupling flow path 321 and the first pressure chamber 331, and the first communication hole 341 and the first coupling section 361. The second to fourth individual flow paths can also be grasped in the same manner.

The liquid ejecting head 100 of the second embodiment has the following features in addition to the features described in the first embodiment.

Feature F10

Each of a dimension L141 of the first partition wall portion 141 and a dimension L142 of the second partition wall portion 142 measured in the second direction Dr2 is shorter than the dimension obtained by subtracting the dimensions L141 and L142 from a dimension L350 of the communication flow path 350. That is, L141<(L350-L141-L142), and L142<(L350-L141-L142). According to this feature F10, it is possible to prevent the pressure wave directed from the first communication hole 341 toward the nozzle 200 from moving toward the second communication hole 342, thereby reducing crosstalk. Furthermore, since the dimension L141 of the first partition wall portion 141 is short, it is possible to suppress an increase in the resistance of the communication flow path 350 itself, and it is possible to suppress a decrease in the circulation flow rate and attenuation of the pressure wave. The second partition wall portion 142 also has the same effect. In addition, as illustrated in FIG. 7, the first partition wall portion 141 preferably extends over both the first communication hole 341 and the second communication hole 342 in the second direction Dr2. Similarly, the second partition wall portion 142 preferably extends over both the third communication hole 343 and the fourth communication hole 344 in the second direction Dr2. Furthermore, it is more preferable that the end portion on the +X side of the first partition wall portion 141 be the same as the end portion on +X side of the communication holes 341 and 342. Similarly, it is more preferable that the end portion on the −X side of the second partition wall portion 142 be the same as the end portion on −X side of the communication holes 343 and 344.

Feature F11

Each of the dimension L141 of the first partition wall portion 141 and the dimension L142 of the second partition wall portion 142 is shorter than ½ times the above dimension (L350-L141-L142). This feature F11 can further enhance the effect of the feature F10 described above. The dimensions L141 and L142 are more preferably shorter than ⅓ times the above dimension (L350-L141-L142), and further more preferably shorter than ¼ times the above dimension (L350-L141-L142).

Figure 9:
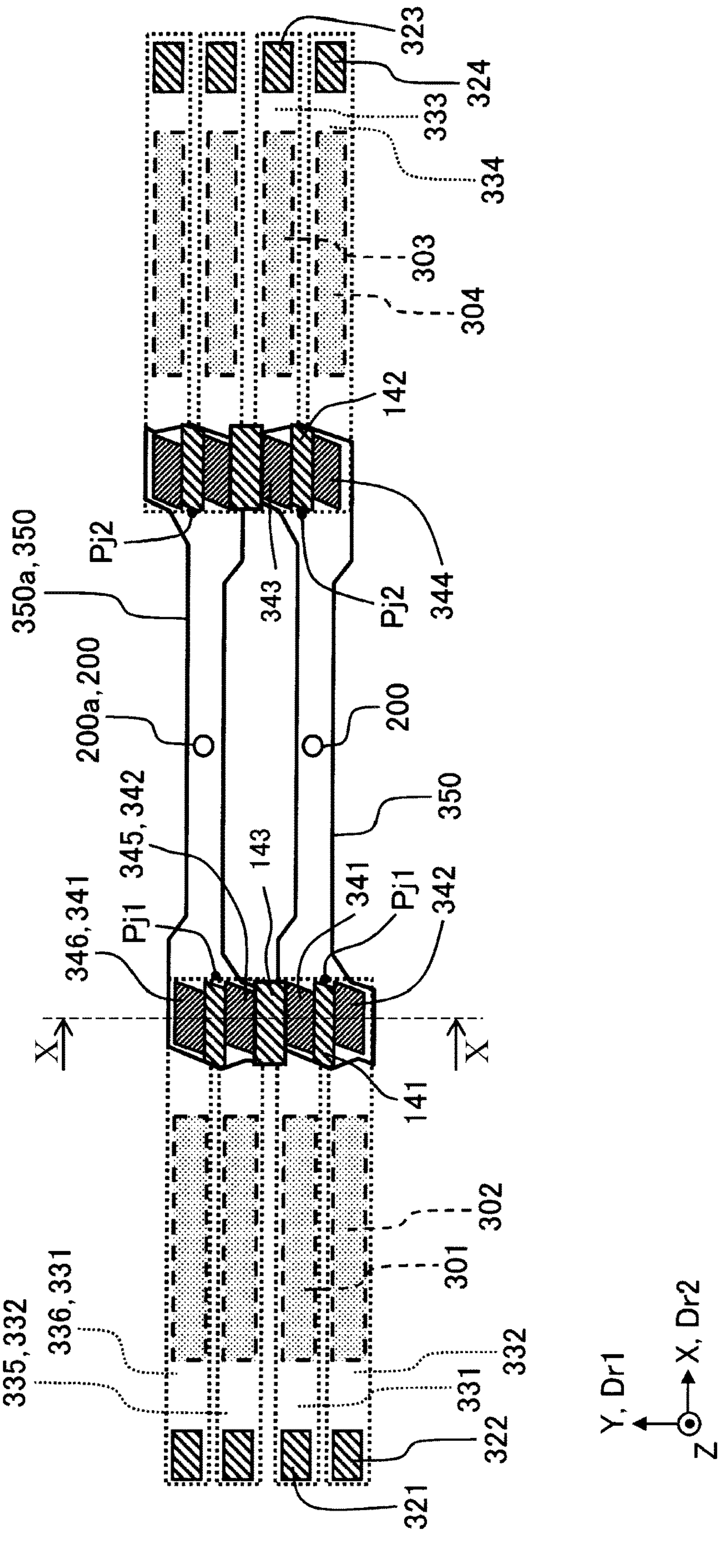
FIG. 9 is a view illustrating arrangement of a plurality of communication flow paths in the second embodiment.
Figure 10:
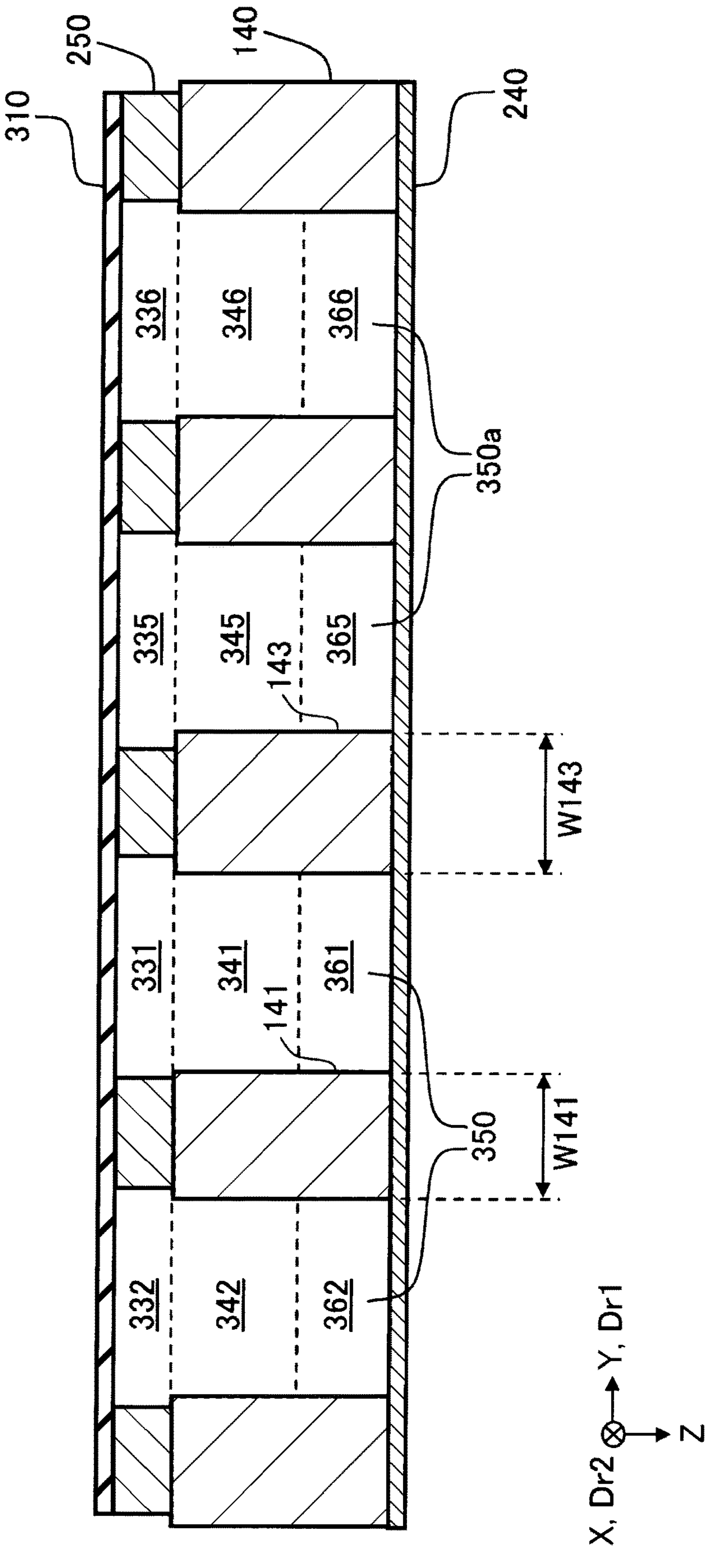
FIG. 10 is a cross-sectional view illustrating a cross section taken along the line X-X of FIG. 9.

FIG. 9 is a view illustrating the arrangement of the plurality of communication flow paths 350 in the second embodiment, and FIG. 10 is a cross-sectional view illustrating a cross section taken along the line X-X of FIG. 9. Here, when the nozzle 200 is assumed to be the first nozzle 200, a nozzle 200*a* adjacent to the first nozzle 200 is assumed to be a second nozzle 200*b*. In FIG. 9, the communication flow path 350 for the first nozzle 200 and the communication flow path 350*a* for the second nozzle 200*a* are drawn side by side. The communication flow path 350*a* is an example of the "second communication flow path". In FIGS. 9 and 10, communication holes 345 and 346 for the second nozzle 200*a* are drawn. These communication holes 345 and 346 correspond to the communication holes 342 and 341 for the first nozzle 200, respectively. The communication hole 345 is an example of the "fifth communication hole". In FIG. 10, pressure chambers 335 and 336 for the second nozzle 200*a* and coupling sections 365 and 366 of the communication flow path 350*a* are also drawn. The pressure chambers 335 and 336 correspond to the pressure chambers 332 and 331 for the first nozzle 200, respectively, and the coupling sections 365 and 366 correspond to the coupling sections 362 and 361 of the communication flow path 350. The pressure chamber 335 is an example of the "fifth pressure chamber". A coupling section 361 for the first nozzle 200 and a coupling section 365 for the second nozzle 200*a* are partitioned by a third partition wall portion 143.

Feature F12

As illustrated in FIG. 10, a thickness W141 of the first partition wall portion 141 measured in the first direction Dr1 is thinner than a thickness W143 of the third partition wall portion 143. Similarly, the thickness of the second partition wall portion 142 is also thinner than the thickness W143 of the third partition wall portion 143. According to this feature F12, the flow path resistance of the communication flow path 350 can be reduced. However, the thickness W141 of the first partition wall portion 141 and the thickness W143 of the third partition wall portion 143 may be equal.

Feature F13

It should be noted that, instead of the feature F12 described above, a feature F13 that "the thickness W141 of the first partition wall portion 141 measured in the first direction Dr1 is thicker than the thickness W143 of the third partition wall portion 143" may be adopted. The same applies to the second partition wall portion 142. This feature F13 can further reduce the influence of crosstalk.

Figure 11:
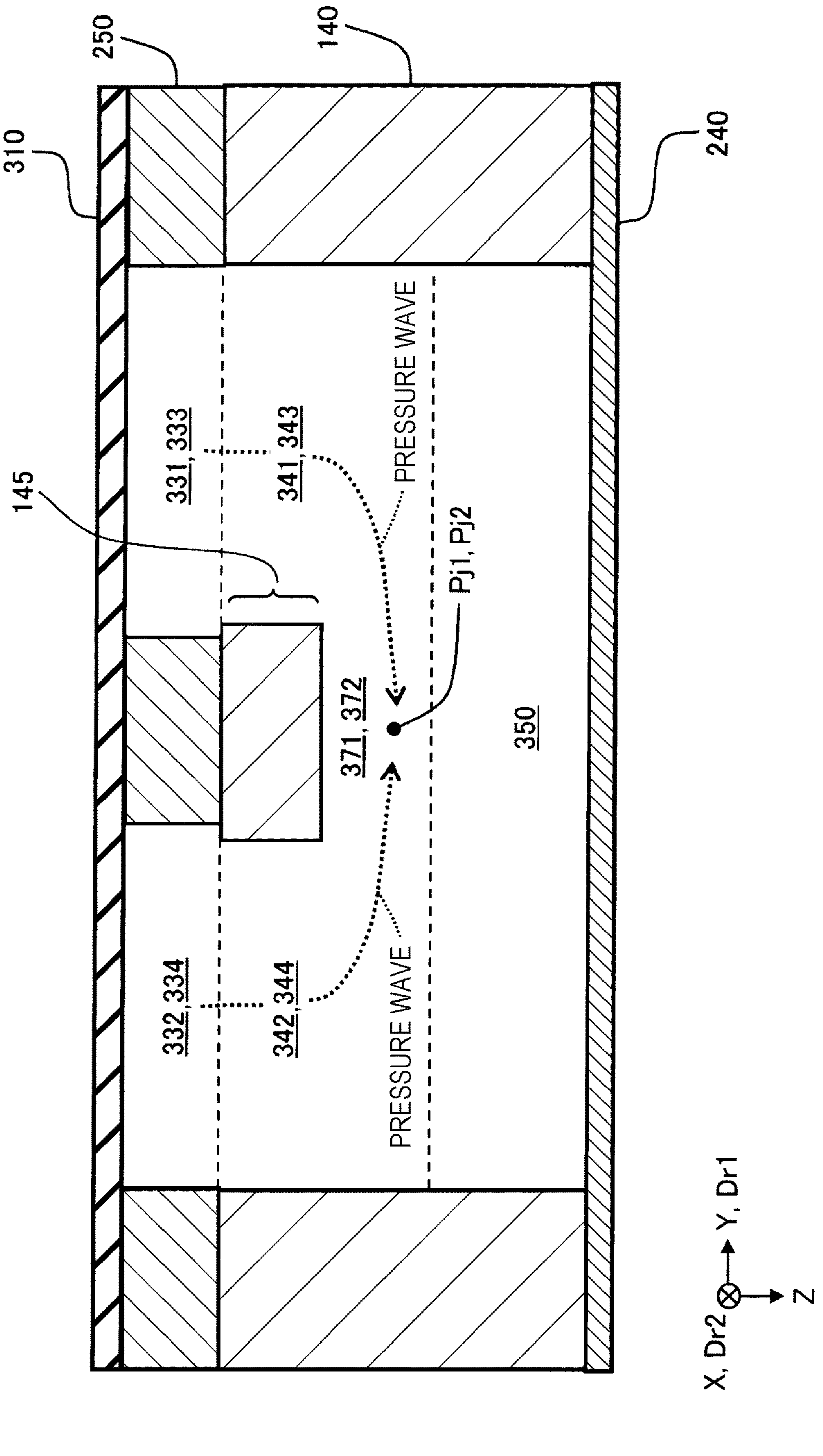
FIG. 11 is a cross-sectional view of a flow path in a third embodiment.

FIG. 11 is a view corresponding to FIG. 6 of the first embodiment, and is a cross-sectional view of the flow path in the third embodiment. In the third embodiment, in the cross section of the first embodiment illustrated in FIG. 6, the dimension of the communication hole partition wall 145 in the Z direction is reduced, the space below the communication hole partition wall 145, that is, on the +Z side of the communication hole partition wall 145, is expanded to provide a first common flow path 371 between the two communication holes 341 and 342 and one end portion of the communication flow path 350. Similarly, a second common flow path 372 is provided between the other two communication holes 343 and 344 and the other end portion of the communication flow path 350. The first common flow path 371 of this embodiment is coupled to the two communication holes 341 and 342 at the end portion on the −Z side, and is coupled to one end portion of the communication flow path 350 at the end portion on the +Z side. Similarly, the second common flow path 372 of this embodiment is coupled to the two communication holes 343 and 344 at the end portion on the −Z side, and is coupled to the other end portion of the communication flow path 350 at the end portion on the +Z side. Other structures of the third embodiment are substantially the same as those of the first embodiment.

Even in the third embodiment, four individual flow paths corresponding to the individual pressure chambers 331 to 334 can be considered. For example, the first individual flow path can be considered to include the first coupling flow path 321 and the first pressure chamber 331, and the first communication hole 341. The second to fourth individual flow paths can also be grasped in the same manner.

The liquid ejecting head 100 of the third embodiment has the following features in addition to the features described in the first embodiment.

Feature F14

As illustrated in FIG. 11, the first joining position Pj1 is positioned at the first common flow path 371, and the second joining position Pj2 is positioned at the second common flow path 372. According to this feature F14, it is possible to appropriately maintain a balance between suppression of crosstalk and suppression of pressure wave attenuation.

Figure 12:
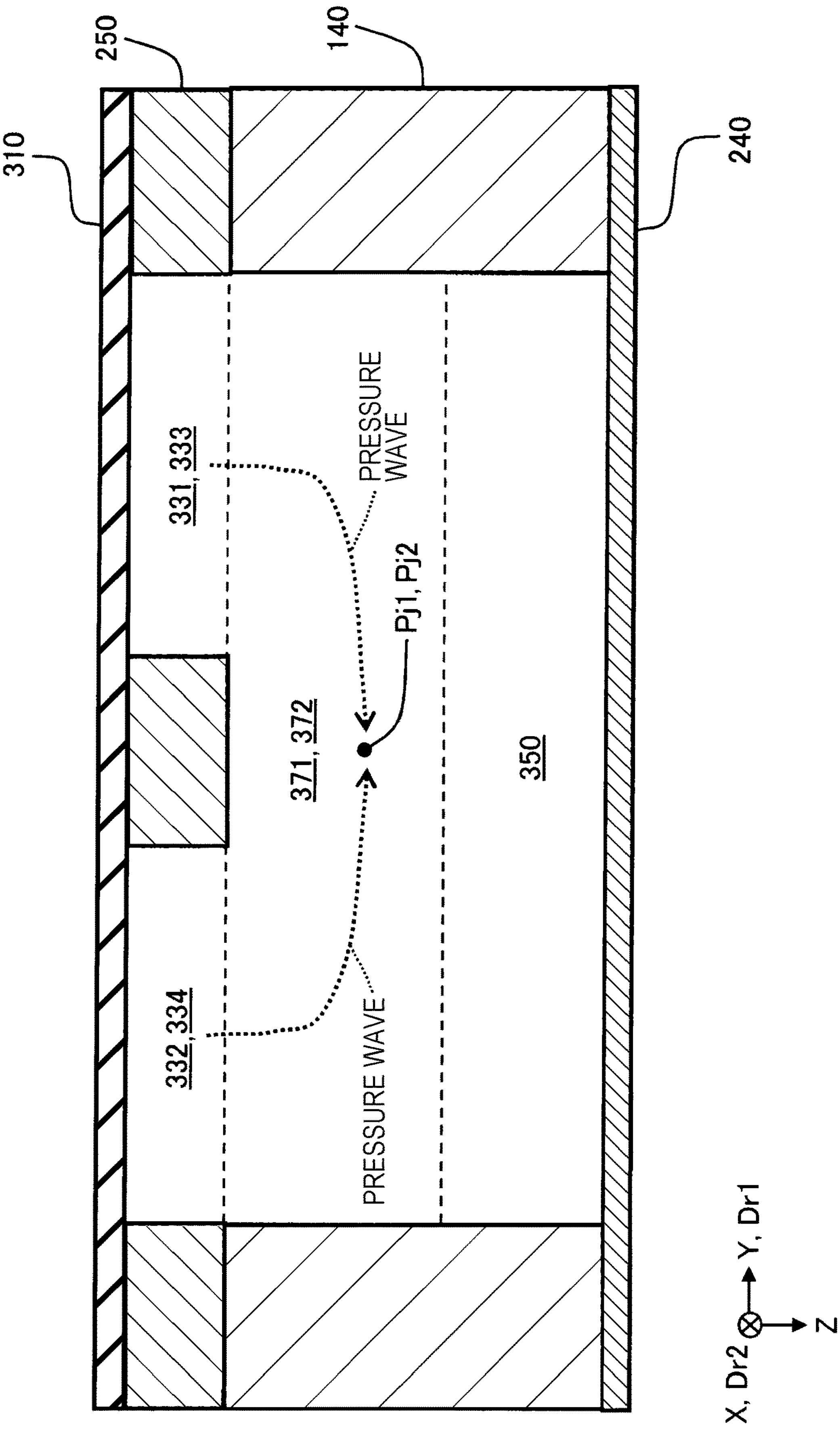
FIG. 12 is a cross-sectional view of a flow path in a fourth embodiment.

FIG. 12 is a cross-sectional view of a flow path in the fourth embodiment. The fourth embodiment further widens the first common flow path 371 and the second common flow path 372 by omitting the communication hole partition wall 145 in the cross section of the third embodiment illustrated in FIG. 11, and other structures are substantially the same as those of the third embodiment. Specifically, the first common flow path 371 couples the first end portion of the first pressure chamber 331 on the nozzle 200 side, the second end portion of the second pressure chamber 332 on the nozzle 200 side, and the one end portion of the communication flow path 350. The second common flow path 372 couples the third end portion of the third pressure chamber 333 on the nozzle 200 side, the fourth end portion of the fourth pressure chamber 334 on the nozzle 200 side, and the other end portion of the communication flow path 350. Similar to the third embodiment, the fourth embodiment also has the feature F14 described above.

Even in the fourth embodiment, four individual flow paths corresponding to the individual pressure chambers 331 to 334 can be considered. For example, the first individual flow path can be considered to include the first coupling flow path 321 and the first pressure chamber 331. The second to fourth individual flow paths can also be grasped in the same manner.

Figure 13:
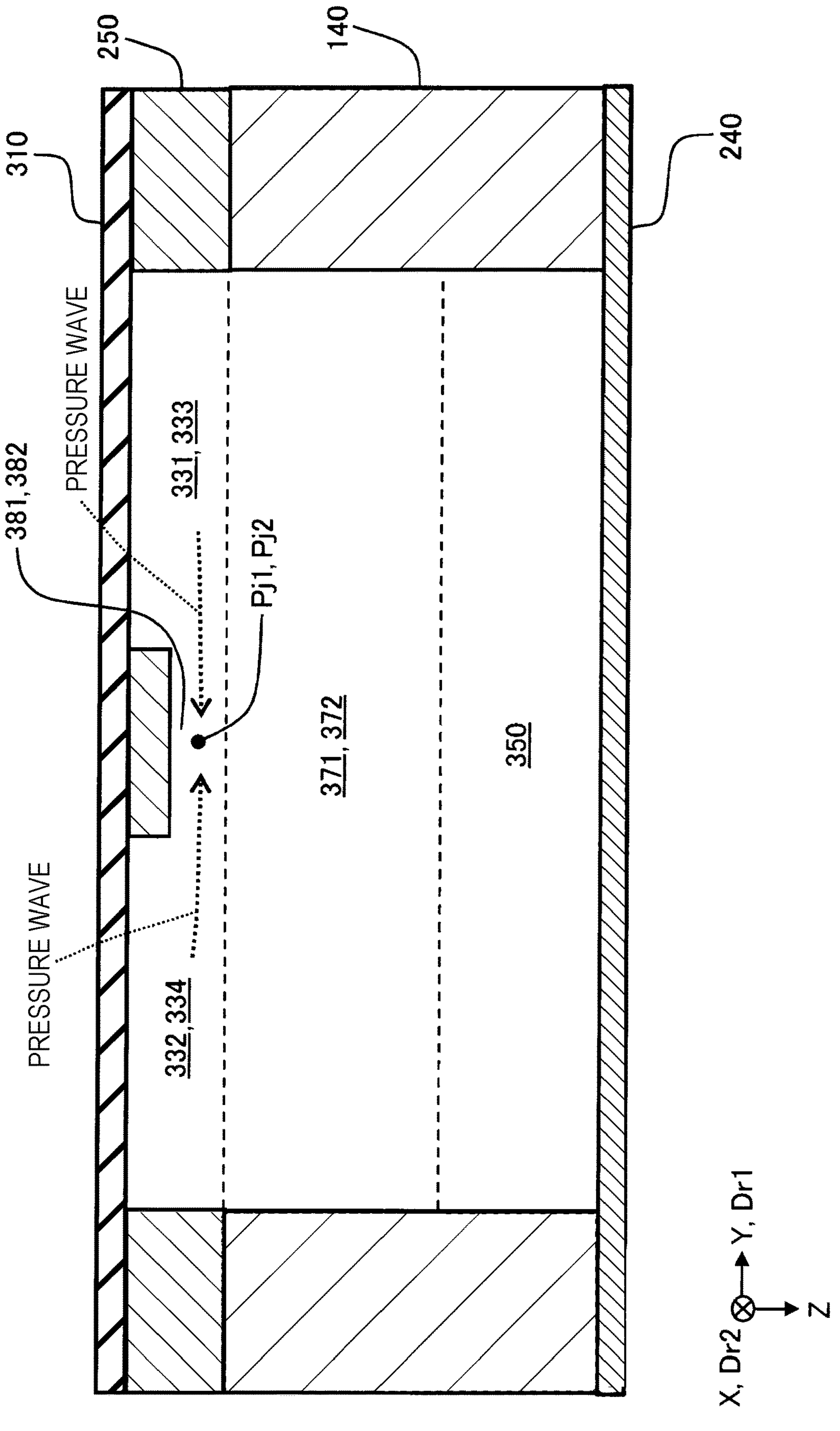
FIG. 13 is a cross-sectional view of a flow path in a fifth embodiment.

FIG. 13 is a cross-sectional view of a flow path in the fifth embodiment. In the fifth embodiment, in the cross section of the fourth embodiment illustrated in FIG. 12, by reducing the dimension in the Z direction of the end portion on the +X side of the partition wall between the adjacent pressure chambers 331 and 332, a first coupling path 381 is formed between the pressure chambers 331 and 332. Similarly, by reducing the dimension in the Z direction of the end portion on the −X side of the partition wall between the adjacent pressure chambers 333 and 334, a second coupling path 382 is formed between the pressure chambers 333 and 334. The first coupling path 381 couples the first end portion of the first pressure chamber 331 on the nozzle 200 side and the second end portion of the second pressure chamber 332 on the nozzle 200 side, and extends the first end portion to the second end portion in the first direction Dr1. The second coupling path 382 couples the third end portion of the third pressure chamber 333 on the nozzle 200 side and the fourth end portion of the fourth pressure chamber 334 on the nozzle 200 side, and extends the third end portion to the fourth end portion in the first direction Dr1. These coupling paths 381 and 382 are defined by the pressure chamber substrate 250. Other structures of the fifth embodiment are substantially the same as those of the third and fourth embodiments.

Even in the fifth embodiment, four individual flow paths corresponding to the individual pressure chambers 331 to 334 can be considered. For example, the first individual flow path can be considered to include the first coupling flow path 321 and the first pressure chamber 331. The second to fourth individual flow paths can also be grasped in the same manner.

The liquid ejecting head 100 of the fifth embodiment has the following features.

Feature F15

The first joining position Pj1 is positioned at the first coupling path 381, and the second joining position Pj2 is positioned at the second coupling path 382. According to this feature F15, attenuation of pressure waves can be suppressed.

Figure 14:
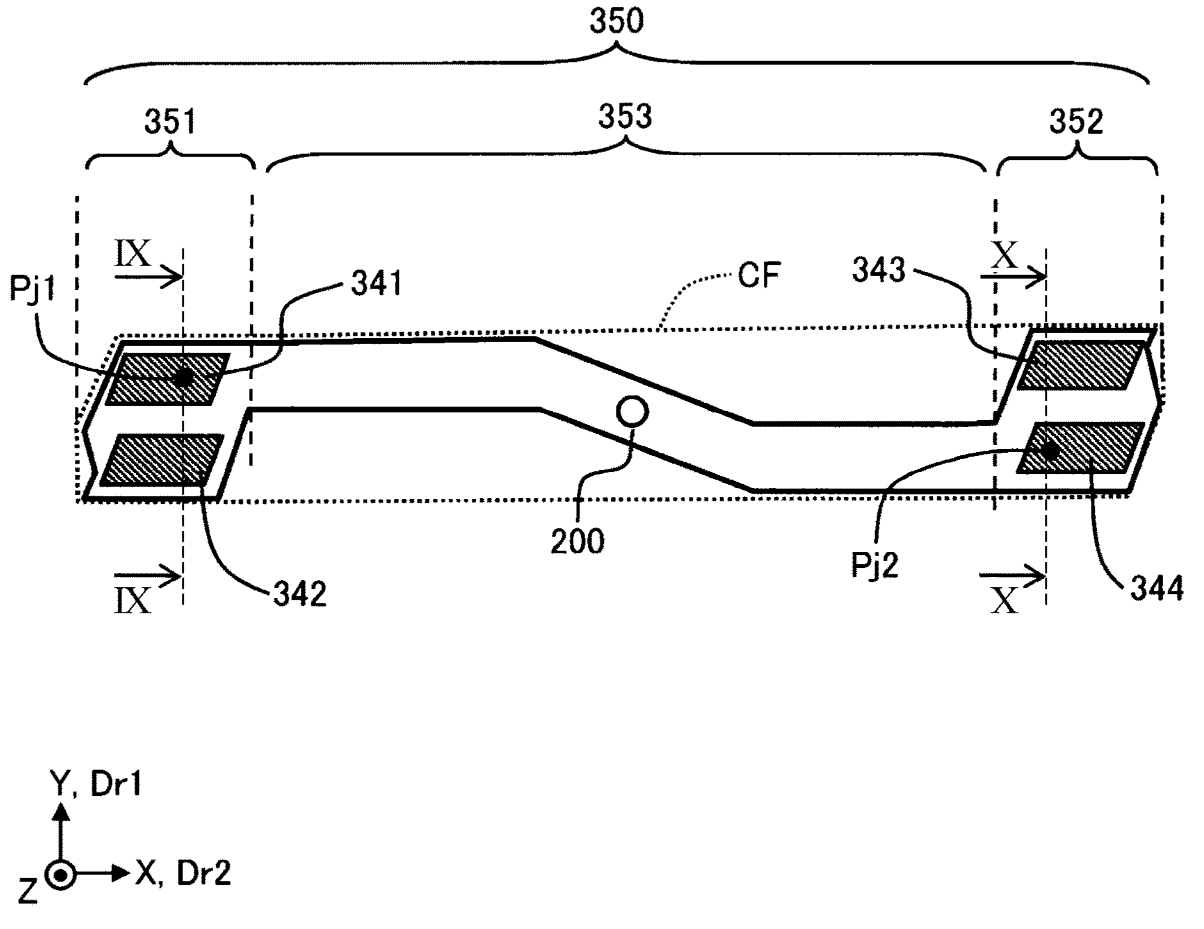
FIG. 14 is a view illustrating a communication flow path in a sixth embodiment.
Figure 15:
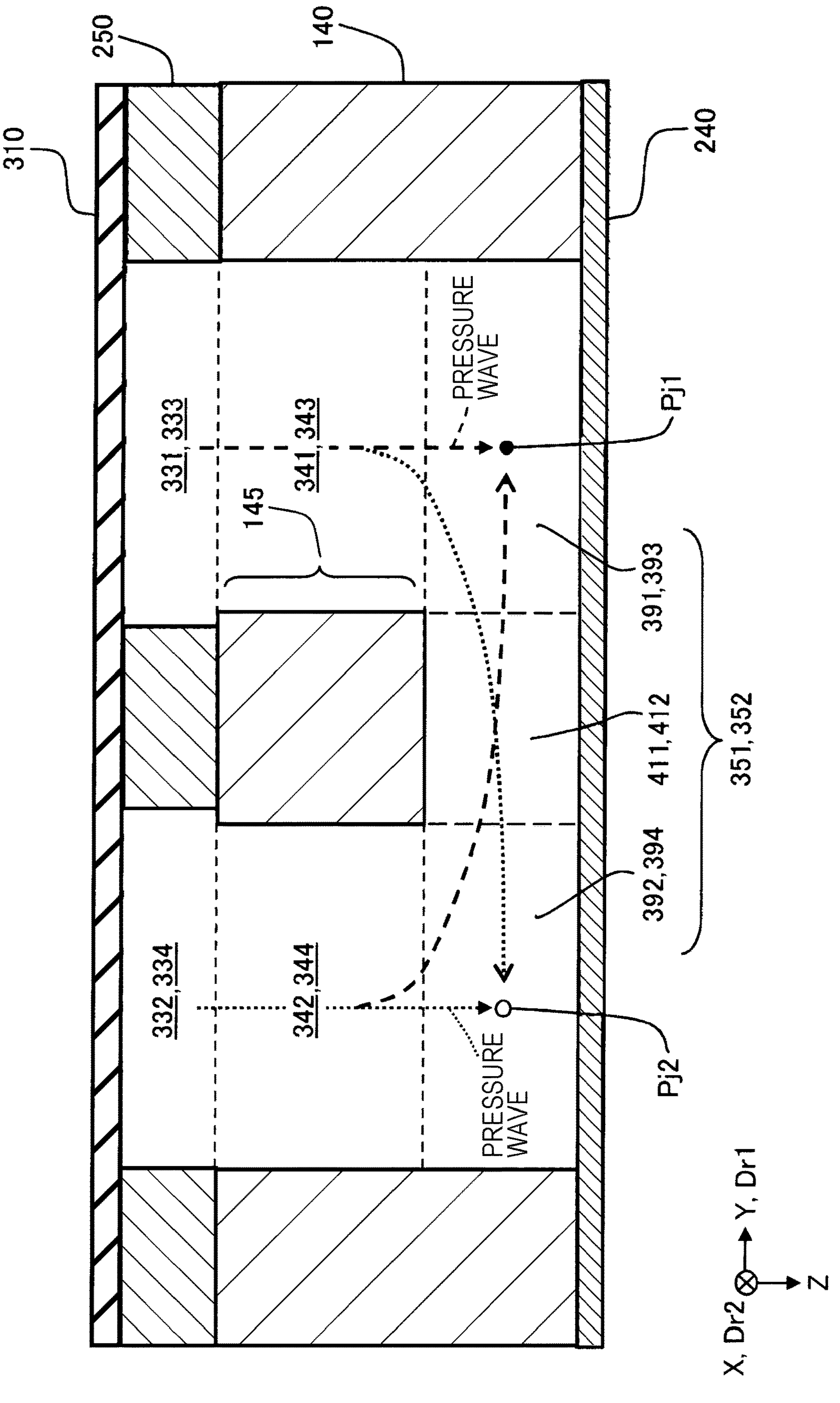
FIG. 15 is a cross-sectional view illustrating a cross section taken along the line IX-IX of FIG. 14.

FIG. 14 is a view illustrating the shape of the communication flow path 350 in the sixth embodiment. FIG. 15 is a view corresponding to FIG. 6 of the first embodiment, and is a cross-sectional view illustrating the cross section taken along the line IX-IX of FIG. 14. Further, in FIG. 15, after the reference numerals of each part in the cross section at the positions of the pressure chambers 331 and 332, the reference numerals of each part in the cross section taken along the line X-X of FIG. 14 at positions of other pressure chambers 333 and 334 are shown by commas. In FIG. 15, the pressure waves from the pressure chambers 331 and 332 are indicated by dashed arrows, the first joining position Pj1 where the pressure waves from the pressure chambers 331 and 332 join is indicated by a black circle, the pressure waves from the other pressure chambers 333 and 334 are indicated by dotted arrows, and the second joining position Pj2 where the pressure waves from the other pressure chambers 333 and 334 join is indicated by a white circle.

The main difference from the first embodiment illustrated in FIG. 5 is only the shape of the third part 353 located at the center of the communication flow path 350, and other configurations are substantially the same as those of the first embodiment. That is, in the sixth embodiment, unlike the first embodiment, the third part 353 is bent in the middle. More specifically, both side portions of the third part 353 are parallel to the second direction Dr2, and the center portion of the third part 353 is inclined with respect to the second direction Dr2. However, even in the sixth embodiment, the point that the entire communication flow path 350 extends in the second direction Dr2, that is, the point that the longitudinal direction of the entire communication flow path 350 is parallel to the second direction Dr2 is the same as that of the first embodiment. In addition, the third part 353 is preferably inside the smallest circumscribed convex polygon CF that includes the first part 351 and the second part 352. This has the advantage that the communication flow paths 350 of adjacent nozzles do not interfere with each other, and thus there is no need to separate the nozzles from each other.

The first part 351 of the communication flow path 350 includes divided into a part 391 directly coupled to the first communication hole 341, a part 392 directly coupled to the second communication hole 342, and a relay flow path 411 for communicating between the part 391 and the part 392. Since the third part 353 of the communication flow path 350 is coupled to the part 391, the pressure waves from the first pressure chamber 331 and the pressure waves from the second pressure chamber 332 join at the part 391. That is, in plan view in the Z direction, the first joining position Pj1 overlaps the first pressure chamber 331.

Similarly, the second part 352 of the communication flow path 350 is divided into a part 393 directly coupled to the third communication hole 343, a part 394 directly coupled to the fourth communication hole 344, and a relay flow path 412 for communicating between the part 393 and the part 394. Since the third part 353 of the communication flow path 350 is coupled to the part 394, the pressure waves from the third pressure chamber 333 and the pressure waves from the fourth pressure chamber 334 join at the part 394. That is, in plan view in the Z direction, the second joining position Pj2 overlaps the fourth pressure chamber 334.

Note that the third part 353 may be coupled to the part 392 and the part 393 instead of the part 391 and the part 394. In other words, in plan view in the Z direction, the first joining position Pj1 may overlap the second pressure chamber 332 and the second joining position Pj2 may overlap the third pressure chamber 333.

As described above, in plan view, the first joining position Pj1 may overlap either the first pressure chamber 331 or the second pressure chamber 332, and the second joining position Pj2 may overlap either the third pressure chamber 333 or the fourth pressure chamber 334.

The sixth embodiment is also different from the first embodiment in that the first communication hole 341 and the third communication hole 343 are at the same position in the first direction Dr1, and the second communication hole 342 and the fourth communication hole 344 are at the same position in the first direction Dr1. However, the first communication hole 341 and the third communication hole 343 may be shifted in the first direction Dr1 as in the first embodiment, and the second communication hole 342 and the fourth communication hole 344 may be shifted in the first direction Dr1.

Figure 16:
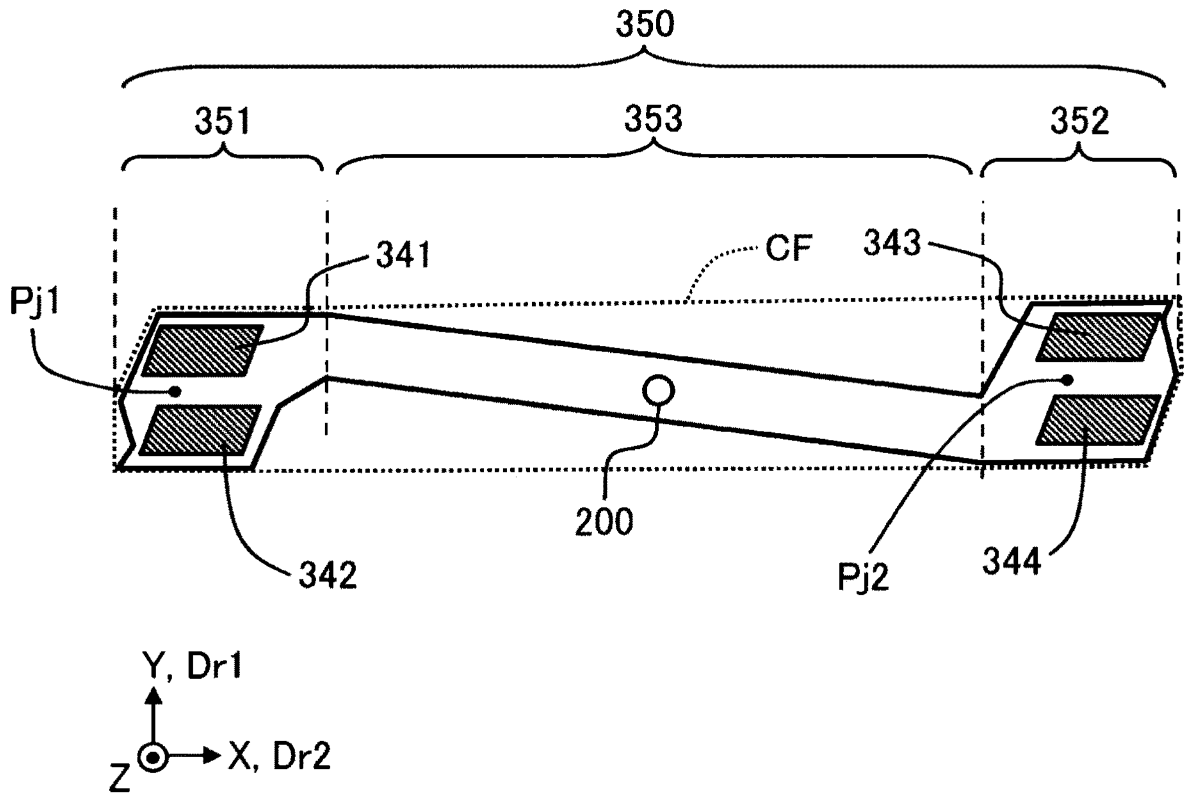
FIG. 16 is a view illustrating a communication flow path in a seventh embodiment.

FIG. 16 is a view illustrating the shape of the communication flow path 350 in the seventh embodiment. Even in the seventh embodiment, the main difference from the first embodiment illustrated in FIG. 5 is only the shape of the third part 353 located at the center of the communication flow path 350, and other configurations are substantially the same as those of the first embodiment. That is, in the seventh embodiment, the third part 353 is linear as in the first embodiment, but extends in a direction inclined from the second direction Dr2. However, even in the seventh embodiment, the point that the entire communication flow path 350 extends in the second direction Dr2 is the same as that of the first embodiment. In addition, even in the seventh embodiment, the third part 353 is inside the smallest circumscribed convex polygon CF that includes the first part 351 and the second part 352.

Figure 17:
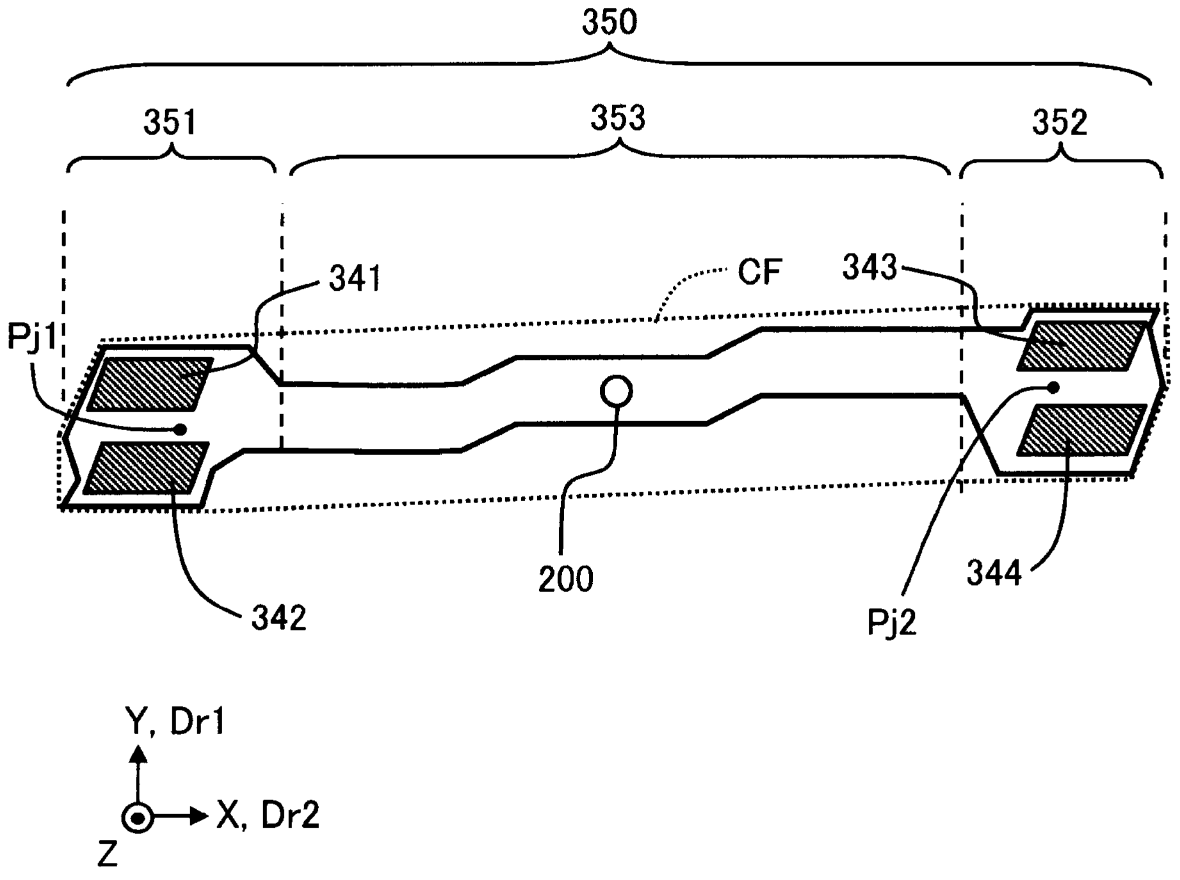
FIG. 17 is a view illustrating a communication flow path in an eighth embodiment.

FIG. 17 is a view illustrating the shape of the communication flow path 350 in the eighth embodiment. Even in the eighth embodiment, the difference from the first embodiment illustrated in FIG. 5 is only the shape of the third part 353 located at the center of the communication flow path 350, and other configurations are substantially the same as those of the first embodiment. That is, in the eighth embodiment, the third part 353 has a shape in which three parts parallel to the second direction Dr2 are coupled obliquely in sequence. However, even in the eighth embodiment, the point that the entire communication flow path 350 extends in the second direction Dr2 is the same as that of the first embodiment. In addition, even in the eighth embodiment, the third part 353 is inside the smallest circumscribed convex polygon CF that includes the first part 351 and the second part 352.

The above-described sixth to eighth embodiments also have substantially the same effect as the first embodiment. In addition, the shapes of the sixth to eighth embodiments may be applied to the above-described second to fifth embodiments.

Figure 18:
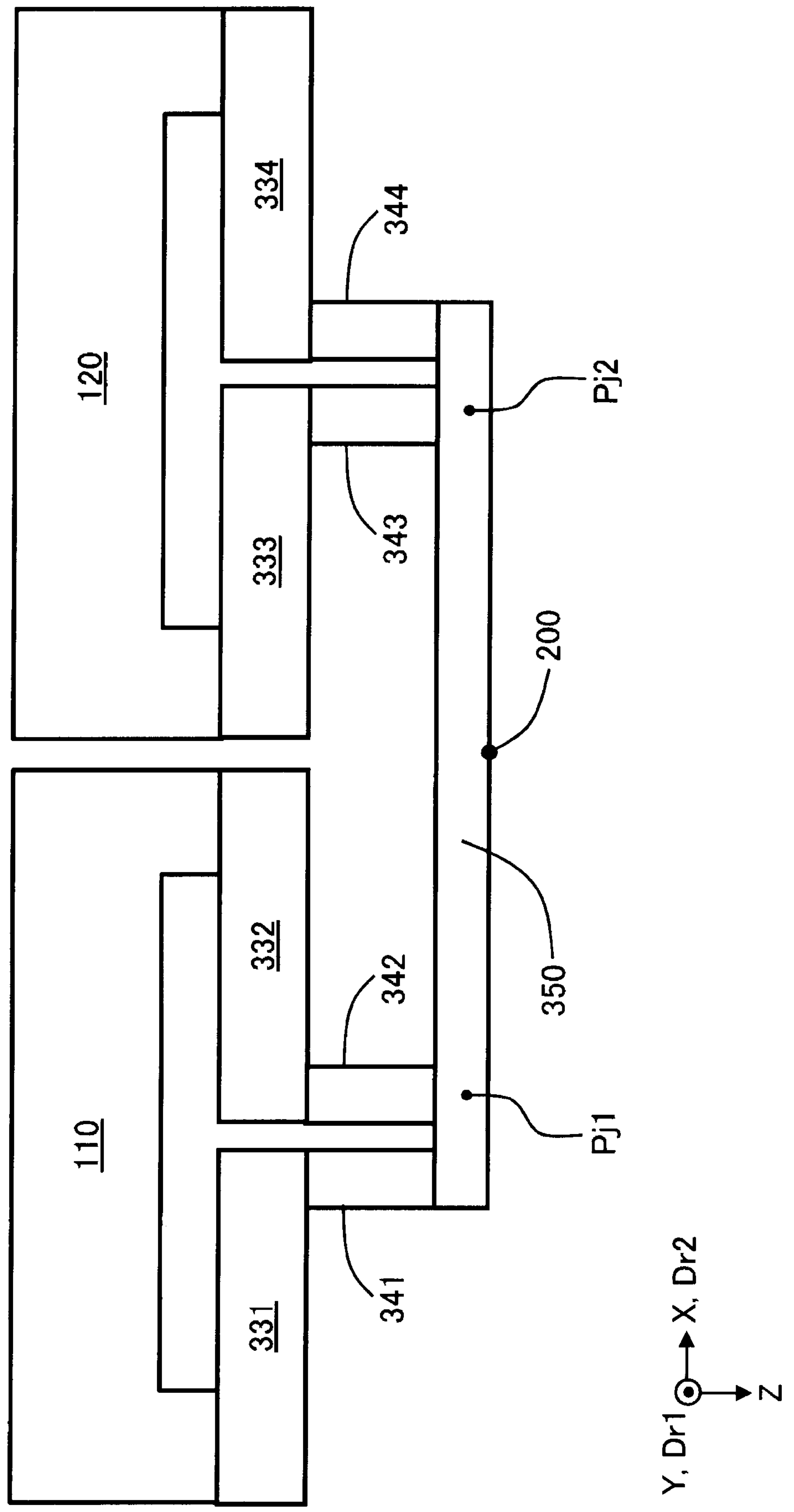
FIG. 18 is a conceptual view illustrating a flow path configuration in a ninth embodiment.

FIG. 18 is a conceptual view illustrating a flow path configuration in the ninth embodiment. The ninth embodiment is different from the above-described first to eighth embodiments in that two common liquid chambers 110 and 120, four pressure chambers 331 to 334, four communication holes 341 to 344, and the communication flow path 350 are arranged being divided into four different height positions. Another difference is that the pressure chambers 331 to 334 are arranged in a direction orthogonal to the Z direction and intersecting the Y direction, which is the direction in which the plurality of nozzles 200 forming the nozzle array NL are arranged. In this embodiment, the pressure chamber 331 to the pressure chamber 334 are arranged in the X direction orthogonal to the Y direction. That is, although not illustrated in detail, there are four rows of pressure chambers including a row in which the plurality of pressure chambers 330 including the pressure chamber 331 are arranged in the Y direction, a row in which the plurality of pressure chambers 330 including the pressure chamber 332 are arranged in the Y direction, a row in which the plurality of pressure chambers 330 including the pressure chamber 333 are arranged in the Y direction, and a row in which the plurality of pressure chambers 330 including the pressure chamber 334 are arranged in the Y direction.

As illustrated in FIG. 18, the first joining position Pj1 is a position overlapping the second pressure chamber 332 in plan view in the Z direction, and the second joining position Pj2 is a position overlapping the third pressure chamber 333 in plan view in the Z direction. Some of the features F1 to F15 described above can also be selectively applied to the ninth embodiment.

As described above, in the liquid ejecting head 100 of the present disclosure, by providing at least a part of the features F1 to F15 described above, excessive attenuation of pressure waves directed from the individual pressure chambers 330 to the nozzles 200 can be prevented.

Modification Example 1

In each of the above-described aspects, the serial type liquid ejecting apparatus 400 that reciprocates the carriage 434 holding the liquid ejecting head 100 is exemplified. However, the present disclosure can also be applied to a line type liquid ejecting apparatus in which the plurality of nozzles 200 are distributed over the entire width of the medium PM. That is, the carriage that holds the liquid ejecting head 100 is not limited to a serial type carriage, and may be a structure that supports the liquid ejecting head 100 in a line type. In this case, for example, the plurality of liquid ejecting heads 100 are arranged side by side in the width direction of the medium PM, and the plurality of liquid ejecting heads 100 are collectively held by one carriage.

Modification Example 2

In each of the above-described aspects, the liquid ejecting apparatus 400 including the circulation mechanism 60 is exemplified. However, the liquid ejecting apparatus 400 may not include the circulation mechanism 60. That is, both the opening portions 161 and 162 of the housing section 160 are inlets for introducing the liquid from the liquid storage section 420, and both the first common liquid chamber 110 and the second common liquid chamber 120 may be used as flow paths for supplying the liquid supplied from the liquid storage section 420 to the nozzle 200.

Modification Example 3

In each of the above-described aspects, four pressure chambers 330 are provided corresponding to one nozzle. However, four or more pressure chambers 330 may be provided corresponding to one nozzle. For example, effects similar to those of each of the above-described aspects can be obtained as long as, when six pressure chambers 330 are provided corresponding to one nozzle, the first joining position Pj1 of the pressure waves from three of the six pressure chambers 330 is closer to the end portions of the three pressure chambers 330 than to the nozzle 200, and the second joining position Pj2 of the pressure waves from the other three of the six pressure chambers 330 is closer to the end portions of the other three pressure chambers 330 than to the nozzle 200.

Modification Example 4

In each of the above-described aspects, one coupling flow path 320 is coupled to each of the pressure chambers 331 to 334. However, the common coupling flow path 320 may be provided for the pressure chambers 331 and 332 coupled to the same first common liquid chamber 110. In other words, one coupling flow path 320 may be provided corresponding to the plurality of pressure chambers 330. The same applies to pressure chambers 333 and 334 coupled to the same second common liquid chamber 120. When considering four individual flow paths corresponding to the individual pressure chambers 331 to 334 in Modification Example 4, for example, the first individual flow path does not include the coupling flow path 320. The second to fourth individual flow paths can also be grasped in the same manner.

Modification Example 5

In each of the above-described aspects, the coupling flow path 320 is a flow path extending in the Z direction. However, the coupling flow path 320 may be a flow path extending in a direction intersecting the Z direction, and may be a flow path including both a part extending in the Z direction and a part extending in a direction intersecting the Z direction.

Modification Example 6

The liquid ejecting apparatus exemplified in the embodiments can be adopted in various devices such as a facsimile machine and a copier, in addition to a device dedicated to printing. However, the application of the liquid ejecting apparatus is not limited to printing. For example, a liquid ejecting apparatus that ejects a solution of a coloring material is used as a manufacturing device for forming a color filter of a display device such as a liquid crystal display panel. Further, the liquid ejecting apparatus that ejects a solution of a conductive material is used as a manufacturing device for forming wiring or electrodes on the wiring substrate. Further, a liquid ejecting apparatus that ejects a solution of an organic substance related to a living body is used, for example, as a manufacturing device for manufacturing a biochip.

Other Aspects

The present disclosure is not limited to the above-described embodiments and can be implemented with various aspects without departing from the spirit thereof. For example, the present disclosure can also be implemented in the following aspects. For example, the technical features in the embodiments corresponding to the technical features in each aspect described below are to solve some or all of the above-described problems, or in order to achieve some or all of the above-described effects, replacement or combination can be performed as appropriate. Unless the technical features are described as essential in the present specification, deletion is possible as appropriate.

1. According to a first aspect of the present disclosure, there is provided a liquid ejecting head including: a nozzle for ejecting a liquid; first to fourth pressure chambers; a communication flow path coupled to the nozzle and communicating between the nozzle and the first to fourth pressure chambers; a first driving element that changes a pressure in the first pressure chamber; a second driving element that changes a pressure in the second pressure chamber; a third driving element that changes a pressure in the third pressure chamber; a fourth driving element that changes a pressure in the fourth pressure chamber; a first common liquid chamber that communicates with the first pressure chamber and the second pressure chamber; and a second common liquid chamber that communicates with the third pressure chamber and the fourth pressure chamber. In plan view, a first joining position where a first pressure wave transmitted from the first pressure chamber to the nozzle by the first driving element joins a second pressure wave transmitted from the second pressure chamber to the nozzle by the second driving element, is closer to a first end portion of the first pressure chamber on a nozzle side and a second end portion of the second pressure chamber on the nozzle side than to the nozzle. In plan view, a second joining position where a third pressure wave transmitted from the third pressure chamber to the nozzle by the third driving element joins a fourth pressure wave transmitted from the fourth pressure chamber to the nozzle by the fourth driving element, is closer to a third end portion of the third pressure chamber on the nozzle side and a fourth end portion of the fourth pressure chamber on the nozzle side than to the nozzle.

According to this liquid ejecting head, the pressure waves are combined not on the nozzle side but on the pressure chamber side, and thus excessive attenuation of the pressure waves directed from the individual pressure chambers to the nozzles can be prevented.

2. In the liquid ejecting head, in plan view, the first joining position may be between the first pressure chamber and the second pressure chamber, and in plan view, the second joining position may be between the third pressure chamber and the fourth pressure chamber.

3. In the liquid ejecting head, in plan view, the first joining position may overlap one of the first and second pressure chambers, and in plan view, the second joining position may overlap one of the third and fourth pressure chambers.

4. In the liquid ejecting head, the first joining position may be provided at one end portion of the communication flow path, and the second joining position may be provided at the other end portion.

5. The liquid ejecting head may further include: a first flow path extending in a direction intersecting an extending direction of the communication flow path and coupling the communication flow path and the first pressure chamber; a second flow path extending in the direction intersecting the extending direction of the communication flow path and coupling the communication flow path and the second pressure chamber; a third flow path extending in the direction intersecting the extending direction of the communication flow path and coupling the communication flow path and the third pressure chamber; and a fourth flow path extending in the direction intersecting the extending direction of the communication flow path and coupling the communication flow path and the fourth pressure chamber. The communication flow path may include a first part disposed at one end of the communication flow path and coupling the first flow path and the second flow path, a second part disposed at the other end of the communication flow path and coupling the third flow path and the fourth flow path, and a third part coupled to the first part and the second part. The first joining position may be positioned at the first part, and the second joining position may be positioned at the second part.

6. In the liquid ejecting head, the first pressure chamber and the second pressure chamber may be arranged side by side in a first direction, the third pressure chamber and the fourth pressure chamber may be arranged side by side in the first direction, the first pressure chamber and the second pressure chamber, and the third pressure chamber and the fourth pressure chamber may be arranged to be shifted in a second direction orthogonal to the first direction, and a dimension of the third part in the second direction may be longer than a dimension of the first part in the second direction.

7. In the liquid ejecting head, the first pressure chamber and the second pressure chamber may be arranged side by side in a first direction, the third pressure chamber and the fourth pressure chamber may be arranged side by side in the first direction, the first pressure chamber and the second pressure chamber, and the third pressure chamber and the fourth pressure chamber may be arranged to be shifted in a second direction orthogonal to the first direction, and the third part may be coupled to the nozzle.

8. In the liquid ejecting head, a width of the third part in the first direction may be smaller than a width of the first part in the first direction.

9. The liquid ejecting head may further include: a first flow path extending in a direction intersecting an extending direction of the communication flow path and coupling the communication flow path and the first pressure chamber; a second flow path extending in the direction intersecting the extending direction of the communication flow path and coupling the communication flow path and the second pressure chamber; a third flow path extending in the direction intersecting the extending direction of the communication flow path and coupling the communication flow path and the third pressure chamber; and a fourth flow path extending in the direction intersecting the extending direction of the communication flow path and coupling the communication flow path and the fourth pressure chamber. In addition, the liquid ejecting head may further include: a first partition wall portion that partitions a first coupling section individually coupled to the first flow path and a second coupling section individually coupled to the second flow path in the communication flow path; and a second partition wall portion that partitions a third coupling section individually coupled to the third flow path and a fourth coupling section individually coupled to the fourth flow path in the communication flow path. The first pressure chamber and the second pressure chamber may be arranged side by side in a first direction, the third pressure chamber and the fourth pressure chamber may be arranged side by side in the first direction, and the first pressure chamber and the second pressure chamber, and the third pressure chamber and the fourth pressure chamber may be arranged to be shifted in a second direction orthogonal to the first direction. Each of a first dimension of the first partition wall portion in the second direction and a second dimension of the second partition wall portion in the second direction may be shorter than a third dimension obtained by subtracting the first dimension and the second dimension from a dimension of the communication flow path in the second direction.

10. In the liquid ejecting head, the first dimension may be shorter than ½ times the third dimension.

11. The liquid ejecting head may further include: a second nozzle adjacent to the nozzle; a fifth pressure chamber adjacent to the first pressure chamber; a second communication flow path coupled to the second nozzle and communicating between the second nozzle and the fifth pressure chamber; a fifth flow path coupling the second communication flow path and the fifth pressure chamber; and a third partition wall portion that partitions a fifth coupling section individually coupled to the fifth flow path in the second communication flow path and the first coupling section. A thickness of the first partition wall portion in the first direction may be thinner than a thickness of the third partition wall portion.

12. The liquid ejecting head may further include: a second nozzle adjacent to the nozzle; a fifth pressure chamber adjacent to the first pressure chamber; a second communication flow path coupled to the second nozzle and communicating between the second nozzle and the fifth pressure chamber; a fifth flow path coupling the second communication flow path and the fifth pressure chamber; and a third partition wall portion that partitions a fifth coupling section individually coupled to the fifth flow path in the second communication flow path and the first coupling section. A thickness of the first partition wall portion in the first direction may be greater than a thickness of the third partition wall portion.

13. In the liquid ejecting head, each of the first to fourth flow paths may extend in the direction intersecting the extending direction of the communication flow path.

14. The liquid ejecting head may include: a first coupling flow path coupling the first common liquid chamber and the first pressure chamber; a second coupling flow path coupling the first common liquid chamber and the second pressure chamber; a third coupling flow path coupling the second common liquid chamber and the third pressure chamber; and a fourth coupling flow path coupling the second common liquid chamber and the fourth pressure chamber. The first flow path may be closer to the nozzle than is the first coupling flow path in plan view, the second flow path may be closer to the nozzle than is the second coupling flow path in plan view, the third flow path may be closer to the nozzle than is the third coupling flow path in plan view, and the fourth flow path may be closer to the nozzle than is the fourth coupling flow path in plan view.

15. The liquid ejecting head may further include: a first common flow path extending in a direction intersecting an extending direction of the communication flow path, coupled to both the first end portion and the second end portion, and coupling the first end portion and the second end portion and the communication flow path; and a second common flow path extending in the direction intersecting the extending direction of the communication flow path, coupled to both the third end portion and the fourth end portion, and coupling the third end portion and the fourth end portion and the communication flow path. The first joining position may be positioned on the first common flow path, and the second joining position may be positioned on the second common flow path.

16. In the liquid ejecting head, the first pressure chamber and the second pressure chamber may be arranged side by side in a first direction, the third pressure chamber and the fourth pressure chamber may be arranged side by side in the first direction, the first pressure chamber and the second pressure chamber, and the third pressure chamber and the fourth pressure chamber may be arranged to be shifted in a second direction orthogonal to the first direction, and the liquid ejecting head may further include: a first coupling path coupling the first end portion and the second end portion and extending in the first direction from the first end portion to the second end portion; and a second coupling path coupling the third end portion and the fourth end portion and extending in the first direction from the third end portion to the fourth end portion. The first joining position may be positioned on the first coupling path, and the second joining position may be positioned on the second coupling path.

17. In the liquid ejecting head, the first common liquid chamber may be a flow path for supplying a liquid to the first and second pressure chambers, and the second common liquid chamber may be a flow path for collecting a liquid from the third and fourth pressure chambers.

18. In the liquid ejecting head, the liquid may be ink having pseudoplasticity.

19. In the liquid ejecting head, the pseudoplastic ink may have a viscosity of 0.01 Pa·s or more and 0.2 Pas or less at a shear rate of 1000 $s^{-1}$ at 25° C., and a viscosity of 0.5 Pa·s or more and 50 Pa·s or less at a shear rate of 0.01 $s^{-1}$.

20. According to a second aspect of the present disclosure, there is provided a liquid ejecting apparatus including: the liquid ejecting head; and a liquid storage section for storing a liquid supplied to the liquid ejecting head.

The present disclosure can also be implemented in various aspects other than the liquid ejecting head and the liquid ejecting apparatus. For example, the present disclosure can be implemented in the aspect of a method for manufacturing a liquid ejecting head and a liquid ejecting apparatus, a method for controlling the liquid ejecting head and the liquid ejecting apparatus, a computer program for implementing the control method, and a non-temporary recording medium that records the computer program.

What is claimed is:

1. A liquid ejecting head comprising:
a nozzle configured to eject a liquid;
first to fourth pressure chambers;
a communication flow path coupled to the nozzle and communicating between the nozzle and the first to fourth pressure chambers;
a first driving element configured to change a pressure in the first pressure chamber;
a second driving element configured to change a pressure in the second pressure chamber;
a third driving element configured to change a pressure in the third pressure chamber;
a fourth driving element configured to change a pressure in the fourth pressure chamber;
a first common liquid chamber that is communicating with the first pressure chamber and the second pressure chamber and that is a liquid chamber common to the first pressure chamber and the second pressure chamber; and a second common liquid chamber that is communicating with the third pressure chamber and the fourth pressure chamber and that is a liquid chamber common to the third pressure chamber and the fourth pressure chamber, the first common liquid chamber and the second common liquid chamber being different from each other, wherein the first pressure chamber has a first end portion that is opposite from an end portion communicating with the first common liquid chamber, the first end portion communicating with the nozzle, the second pressure chamber has a second end portion that is opposite from an end portion communicating with the first common liquid chamber, the second end portion communicating with the nozzle, the third pressure chamber has a third end portion that is opposite from an end portion communicating with the second common liquid chamber, the third end portion communicating with the nozzle, the fourth pressure chamber has a fourth end portion that is opposite from an end portion communicating with the second common liquid chamber, the fourth end portion communicating with the nozzle, in plan view, a distance between the first end portion and a first joining position where a first pressure wave transmitted from the first pressure chamber to the nozzle by the first driving element joins a second pressure wave transmitted from the second pressure chamber to the nozzle by the second driving element and a distance between the second end portion and the first joining position, are respectively shorter than a distance between the nozzle and the first joining position, and in plan view, a distance between the third end portion and a second joining position where a third pressure wave transmitted from the third pressure chamber to the nozzle by the third driving element joins a fourth pressure wave transmitted from the fourth pressure chamber to the nozzle by the fourth driving element, and a distance between the fourth end portion and the second joining position, are respectively shorter than a distance between the nozzle and the second joining position.

2. The liquid ejecting head according to claim 1, wherein in plan view, the first joining position is between the first pressure chamber and the second pressure chamber, and in plan view, the second joining position is between the third pressure chamber and the fourth pressure chamber.

3. The liquid ejecting head according to claim 1, wherein in plan view, the first joining position overlaps one of the first and second pressure chambers, and in plan view, the second joining position overlaps one of the third and fourth pressure chambers.

4. The liquid ejecting head according to claim 1, wherein the first joining position is provided at one end portion of the communication flow path, and the second joining position is provided at the other end portion.

5. The liquid ejecting head according to claim 1, further comprising:

a first flow path extending in a direction intersecting an extending direction of the communication flow path and coupling the communication flow path and the first pressure chamber;

a second flow path extending in the direction intersecting the extending direction of the communication flow path and coupling the communication flow path and the second pressure chamber;

a third flow path extending in the direction intersecting the extending direction of the communication flow path and coupling the communication flow path and the third pressure chamber; and a fourth flow path extending in the direction intersecting the extending direction of the communication flow path and coupling the communication flow path and the fourth pressure chamber, wherein the communication flow path includes a first part disposed at one end of the communication flow path and coupling the first flow path and the second flow path, a second part disposed at the other end of the communication flow path and coupling the third flow path and the fourth flow path, and a third part coupled to the first part and the second part, the first joining position is positioned at the first part, and the second joining position is positioned at the second part.

6. The liquid ejecting head according to claim 5, wherein the first pressure chamber and the second pressure chamber are arranged side by side in a first direction, the third pressure chamber and the fourth pressure chamber are arranged side by side in the first direction, the first pressure chamber and the second pressure chamber, and the third pressure chamber and the fourth pressure chamber are arranged to be shifted in a second direction orthogonal to the first direction, and a dimension of the third part in the second direction is longer than a dimension of the first part in the second direction.

7. The liquid ejecting head according to claim 5, wherein the first pressure chamber and the second pressure chamber are arranged side by side in a first direction, the third pressure chamber and the fourth pressure chamber are arranged side by side in the first direction, the first pressure chamber and the second pressure chamber, and the third pressure chamber and the fourth pressure chamber are arranged to be shifted in a second direction orthogonal to the first direction, and the third part is coupled to the nozzle.

8. The liquid ejecting head according to claim 7, wherein a width of the third part in the first direction is smaller than a width of the first part in the first direction.

9. The liquid ejecting head according to claim 5, wherein each of the first to fourth flow paths extends in the direction intersecting the extending direction of the communication flow path.

10. The liquid ejecting head according to claim 5, further comprising:

a first coupling flow path coupling the first common liquid chamber and the first pressure chamber;

a second coupling flow path coupling the first common liquid chamber and the second pressure chamber;

a third coupling flow path coupling the second common liquid chamber and the third pressure chamber; and a fourth coupling flow path coupling the second common liquid chamber and the fourth pressure chamber, wherein the first flow path is closer to the nozzle than is the first coupling flow path in plan view, the second flow path is closer to the nozzle than is the second coupling flow path in plan view, the third flow path is closer to the nozzle than is the third coupling flow path in plan view, and the fourth flow path is closer to the nozzle than is the fourth coupling flow path in plan view.

11. The liquid ejecting head according to claim 1, further comprising:

a first flow path extending in a direction intersecting an extending direction of the communication flow path and coupling the communication flow path and the first pressure chamber;

a second flow path extending in the direction intersecting the extending direction of the communication flow path and coupling the communication flow path and the second pressure chamber;

a third flow path extending in the direction intersecting the extending direction of the communication flow path and coupling the communication flow path and the third pressure chamber;

a fourth flow path extending in the direction intersecting the extending direction of the communication flow path and coupling the communication flow path and the fourth pressure chamber;

a first partition wall portion that partitions a first coupling section individually coupled to the first flow path and a second coupling section individually coupled to the second flow path in the communication flow path; and a second partition wall portion that partitions a third coupling section individually coupled to the third flow path and a fourth coupling section individually coupled to the fourth flow path in the communication flow path, wherein the first pressure chamber and the second pressure chamber are arranged side by side in a first direction, the third pressure chamber and the fourth pressure chamber are arranged side by side in the first direction, the first pressure chamber and the second pressure chamber, and the third pressure chamber and the fourth pressure chamber are arranged to be shifted in a second direction orthogonal to the first direction, and each of a first dimension of the first partition wall portion in the second direction and a second dimension of the second partition wall portion in the second direction is shorter than a third dimension obtained by subtracting the first dimension and the second dimension from a dimension of the communication flow path in the second direction.

12. The liquid ejecting head according to claim 11, wherein the first dimension is shorter than ½ times the third dimension.

13. The liquid ejecting head according to claim 11, further comprising:

a second nozzle adjacent to the nozzle;

a fifth pressure chamber adjacent to the first pressure chamber;

a second communication flow path coupled to the second nozzle and communicating between the second nozzle and the fifth pressure chamber;

a fifth flow path coupling the second communication flow path and the fifth pressure chamber; and a third partition wall portion that partitions a fifth coupling section individually coupled to the fifth flow path in the second communication flow path and the first coupling section, wherein a thickness of the first partition wall portion in the first direction is thinner than a thickness of the third partition wall portion.

14. The liquid ejecting head according to claim 11, further comprising:

a second nozzle adjacent to the nozzle;

a fifth pressure chamber adjacent to the first pressure chamber;

a second communication flow path coupled to the second nozzle and communicating between the second nozzle and the fifth pressure chamber;

a fifth flow path coupling the second communication flow path and the fifth pressure chamber; and a third partition wall portion that partitions a fifth coupling section individually coupled to the fifth flow path in the second communication flow path and the first coupling section, wherein a thickness of the first partition wall portion in the first direction is greater than a thickness of the third partition wall portion.

15. The liquid ejecting head according to claim 1, further comprising:

a first common flow path extending in a direction intersecting an extending direction of the communication flow path, coupled to both the first end portion and the second end portion, and coupling the first end portion and the second end portion and the communication flow path; and a second common flow path extending in the direction intersecting the extending direction of the communication flow path, coupled to both the third end portion and the fourth end portion, and coupling the third end portion and the fourth end portion and the communication flow path, wherein the first joining position is positioned on the first common flow path, and the second joining position is positioned on the second common flow path.

16. The liquid ejecting head according to claim 1, wherein the first pressure chamber and the second pressure chamber are arranged side by side in a first direction, the third pressure chamber and the fourth pressure chamber are arranged side by side in the first direction, the first pressure chamber and the second pressure chamber, and the third pressure chamber and the fourth pressure chamber are arranged to be shifted in a second direction orthogonal to the first direction, the liquid ejecting head further comprises:

a first coupling path coupling the first end portion and the second end portion and extending in the first direction from the first end portion to the second end portion; and a second coupling path coupling the third end portion and the fourth end portion and extending in the first direction from the third end portion to the fourth end portion, the first joining position is positioned on the first coupling path, and the second joining position is positioned on the second coupling path.

17. The liquid ejecting head according to claim 1, wherein the first common liquid chamber is a flow path for supplying a liquid to the first and second pressure chambers, and the second common liquid chamber is a flow path for collecting a liquid from the third and fourth pressure chambers.

18. The liquid ejecting head according to claim 1, wherein the liquid is ink having pseudoplasticity.

19. The liquid ejecting head according to claim 18, wherein the pseudoplastic ink has a viscosity of 0.01 Pa·s or more and 0.2 Pa·s or less at a shear rate of 1000 $s^{-1}$ at 25° C., and a viscosity of 0.5 Pa·s or more and 50 Pa·s or less at a shear rate of 0.01 $s^{-1}$.

20. A liquid ejecting apparatus comprising:

the liquid ejecting head according to claim 1; and a liquid storage section for storing a liquid supplied to the liquid ejecting head.

* * * * *